(12) United States Patent
Ramer et al.

(10) Patent No.: US 8,755,039 B2
(45) Date of Patent: Jun. 17, 2014

(54) LIGHTING DEVICES WITH SENSORS FOR DETECTING ONE OR MORE EXTERNAL CONDITIONS AND NETWORKED SYSTEM USING SUCH DEVICES

(75) Inventors: David P. Ramer, Reston, VA (US); Jack C. Rains, Jr., Herndon, VA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

(21) Appl. No.: 13/463,594

(22) Filed: May 3, 2012

(65) Prior Publication Data

US 2013/0293877 A1 Nov. 7, 2013

(51) Int. Cl.
*G01J 1/00* (2006.01)

(52) U.S. Cl.
USPC .......................................................... 356/213

(58) Field of Classification Search
USPC .......................................................... 356/213
See application file for complete search history.

(56) References Cited

U.S. PATENT DOCUMENTS

| | | | |
|---|---|---|---|
| 4,749,254 A * | 6/1988 | Seaver | ............................. 385/12 |
| 5,705,804 A | 1/1998 | Ramer et al. | |
| 6,043,873 A | 3/2000 | Ramer et al. | |
| 7,333,903 B2 | 2/2008 | Walters et al. | |
| 7,546,167 B2 | 6/2009 | Walters et al. | |
| 8,140,276 B2 | 3/2012 | Walters et al. | |
| 2007/0045524 A1 | 3/2007 | Rains, Jr. et al. | |
| 2009/0299527 A1 | 12/2009 | Huizenga et al. | |
| 2010/0259931 A1 | 10/2010 | Chemel et al. | |
| 2010/0301769 A1 | 12/2010 | Chemel et al. | |
| 2012/0002406 A1 | 1/2012 | Leadford et al. | |
| 2012/0040606 A1 | 2/2012 | Verfuerth | |
| 2012/0086561 A1 | 4/2012 | Ilyes et al. | |

FOREIGN PATENT DOCUMENTS

WO 2011121470 A1 10/2011

OTHER PUBLICATIONS

International Search Report and Written Opinion of the International Searching Authority dated Jul. 2, 2013, for International Application No. PCT/US2013/037968, filed Apr. 24, 2013.

* cited by examiner

*Primary Examiner* — Tu Nguyen
(74) *Attorney, Agent, or Firm* — RatnerPrestia

(57) ABSTRACT

Exemplary lighting devices have sensors, intelligence in the form of programmed processors and communication capabilities. Such a device is configured to monitor one or more conditions external to a lighting device not directly related to operational performance of the respective lighting device. One or more such devices can work in a networked system, to support a variety of applications separate and in addition to the lighting related functions of the device(s).

20 Claims, 6 Drawing Sheets

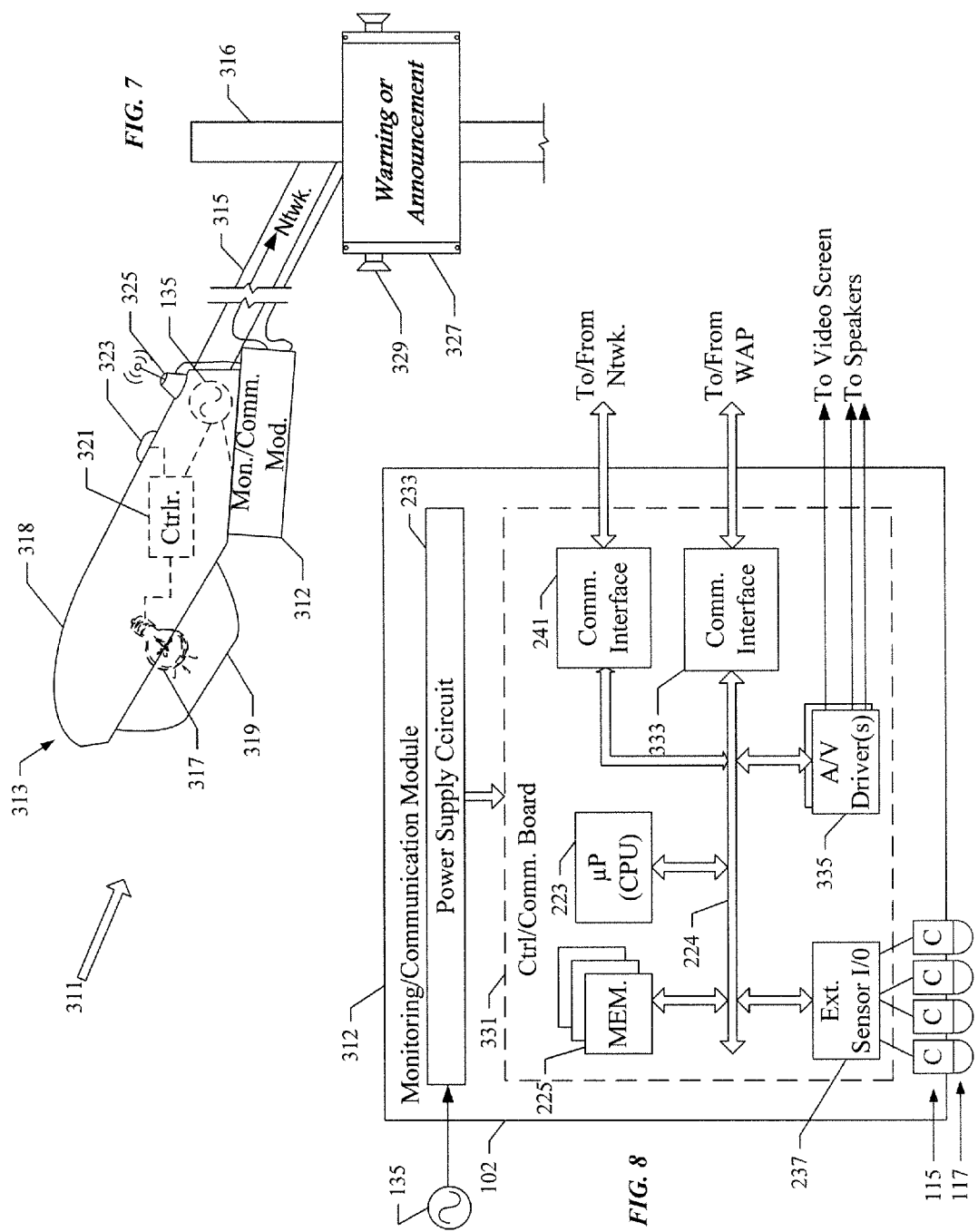

LIGHTING DEVICES WITH SENSORS FOR DETECTING ONE OR MORE EXTERNAL CONDITIONS AND NETWORKED SYSTEM USING SUCH DEVICES

RELATED APPLICATIONS

This application is related to U.S. application Ser. No. 13/463,586 Filed May 3, 2013 (concurrently herewith) entitled "NETWORKED ARCHITECTURE FOR SYSTEM OF LIGHTING DEVICES HAVING INTEGRAL SENSORS, FOR INTELLIGENT APPLICATIONS," the disclosure of which also is entirely incorporated herein by reference.

TECHNICAL FIELD

The present subject matter relates to intelligent lighting devices with sensors, intelligence and communication capabilities to monitor one or more conditions external to a lighting device not directly related to operational performance of the respective lighting device, for a variety of applications separate and in addition to the lighting related functions of the device.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use. Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities within the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. Advanced electronics in the control elements have facilitated more sophisticated control algorithms as well as increased networking of lighting devices.

Sensing and network communications, however, have focused on the lighting functions/applications of the lighting devices. For example, sensors may be provided in a lighting device to detect parameters relevant to control operation of the lighting device, and the processor in the device controls the source(s) of the device in response to the sensor inputs. Alternatively or in addition, a communication interface in each of a number of networked lighting devices may allow communication about the status of each lighting device to a system control center. A programmed computer or a person at the control center then may be able to send commands to individual lighting devices or to groups of lighting devices, for example, based on a decision responsive to one or more conditions sensed by some or all of the lighting devices.

However, these advances in lighting devices and networked systems have mainly addressed aspects of the lighting provided by the lighting devices. For example, lighting devices may be adjusted, turned ON and/or turned OFF based on monitored conditions, either by processor logic within the device(s) or commands from a central control. It also has been suggested that networked lighting devices could provide transport for data communications to/from other devices that may come within range of the lighting device and/or its internal communication interface.

It is also useful to monitor and respond to a wide range of other conditions that do not directly relate to lighting. A vast array of sensor types exists for sensing various conditions. In the home, for example, smoke, fire, carbon monoxide and burglary sensors are common. Often such sensing is locally implemented by individual sensing units, with no coordination. In more sophisticate installations, a number of sensors of various types may be couple to a communication device or system, which provides communications to a central system that monitors a number of enterprise premises or a number of individual customer locations. However, the individual devices and the networked monitoring systems have traditionally been separate and independent from the lighting devices in or at the monitored locales. Even in systems that provide combinations of lighting control and condition monitoring and/or communications related to both functions, the lighting and monitoring equipment are separate devices on the premises with separate power and communication capabilities.

Hence, there is still room for further improvement in lighting and monitoring technologies.

SUMMARY

The lighting devices disclosed herein improve over earlier devices like those outlined above by incorporating external condition sensing as well as network communication capabilities.

An example of a lighting device includes a light source, sensor couplings and sensors. In this example, each sensor coupling is configured to present a standardized sensor connection interface that is compatible with different types of sensors. Each sensor connects to the standardized connection interface of one of the sensor couplings. The first sensor is of a first one of the types and is located so as to sense a first one of a number of conditions external to the lighting device not directly related to operation of the lighting device. The second sensor is of a second one of the types different from the first type and is located so as to sense a second one of the conditions external to the lighting device not directly related to operation of the lighting device. Each of the sensors is configured to output a signal responsive to the respective sensed condition via the standardized connection interface of the respective sensor coupling.

The exemplary lighting device also includes a processor coupled to the sensor couplings for processing data responsive to the signals from the sensors, as well as a memory accessible to the processor that contains one or more programs for execution by the processor. Programming, corresponding at least in part to the first and second types of sensors controls at least one function of the processor responsive to the conditions sensed by the sensors. A communication interface, accessible by the processor, is configured to enable the processor to communicate information resulting from the at least one function of the processor responsive to the conditions sensed by the sensors through a communications network.

In an alternative example, a lighting device may have as few as one coupling and associated sensor, together with the light source, processor, memory, programming and communication interface. In this later example, a program corresponding at least in part to the one type of sensor controls at least one function of the processor responsive to the condition sensed by the sensor in such a way as to implement a standardized application programming interface with respect to the at least one function. The resulting information is communicated through the network via the communication interface in a manner conforming to the standardized application programming interface.

In some illustrated examples, of either type, the light source may be a legacy source, in which case, the other elements of the lighting device may be configured as an apparatus to be used with the light source, e.g. as a module configured to be added to a light fixture previously configured to support the light source. Alternatively, the light source may be integrated with the other elements into a unified configuration. Particular examples of integrated devices use one or more solid state light emitters to form the light source. Whether integrated or added to an existing light source as a new module, some examples control the light source based on the sensing and/or communications whereas and other examples do not.

As outlined in the discussion of the examples above, programming controls one or more functions of the processor responsive to the external condition or conditions sensed by the sensors. For example, the programming may control how data regarding the sensed conditions is collected, processed and formatted for communication, e.g. so as to conform to relevant aspects of the standard interface specification. The programming may also configure the processor to control the light source, either based on internal logic or based on commands received at the device via the network communication.

In addition to the sensor or sensors for one or more external conditions, several of the examples of the lighting device include at least one sensor of a type and located so as to sense a condition related to operation of the lighting device. The additional sensor is configured to output a signal responsive to the sensed condition related to operation of the lighting device. In such examples, the processor is further coupled to process data responsive to the third signal from the third sensor. The programming executed by the processor configures the processor to control operation of the light source at least in part responsive to the processing of the data responsive to the third signal from the third sensor. This control may provide a local or internal feedback loop at the lighting device or may entail communication regarding the additional condition to another device over the network and associated light source control based on receiving responsive commands from the other device.

Examples discussed in detail below may utilize an external sensor that is of a type and is located so as to detect an ambient condition around or near the lighting device and/or an external sensor that is of a type and is located so as to detect a remote condition at some distance from lighting device. Disclosed examples of external ambient condition sensors include a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor. Disclosed examples of external remote condition sensors include a directional light sensor, a video or still image sensor, and a sound detector.

Disclosed examples of sensors to detect a condition related to operation of the lighting device include a sensor for detecting temperature of one or more components of the lighting device, a feedback light sensor for detecting intensity or other characteristic of light produced by the lighting device, an occupancy sensor for detecting a condition indicative of occupancy of a region to be illuminated by the lighting device and an ambient light sensor for detecting ambient light near the lighting device.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7 illustrates another intelligent lighting device.

FIG. 8 is a functional block diagram of a monitoring and communication module used in an example of an intelligent lighting device like that of FIG. 7.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to intelligent lighting devices with associated sensors, intelligence and communication capabilities. Reference now is made in detail to the examples illustrated in the accompanying drawings and discussed below.

Figure 1:
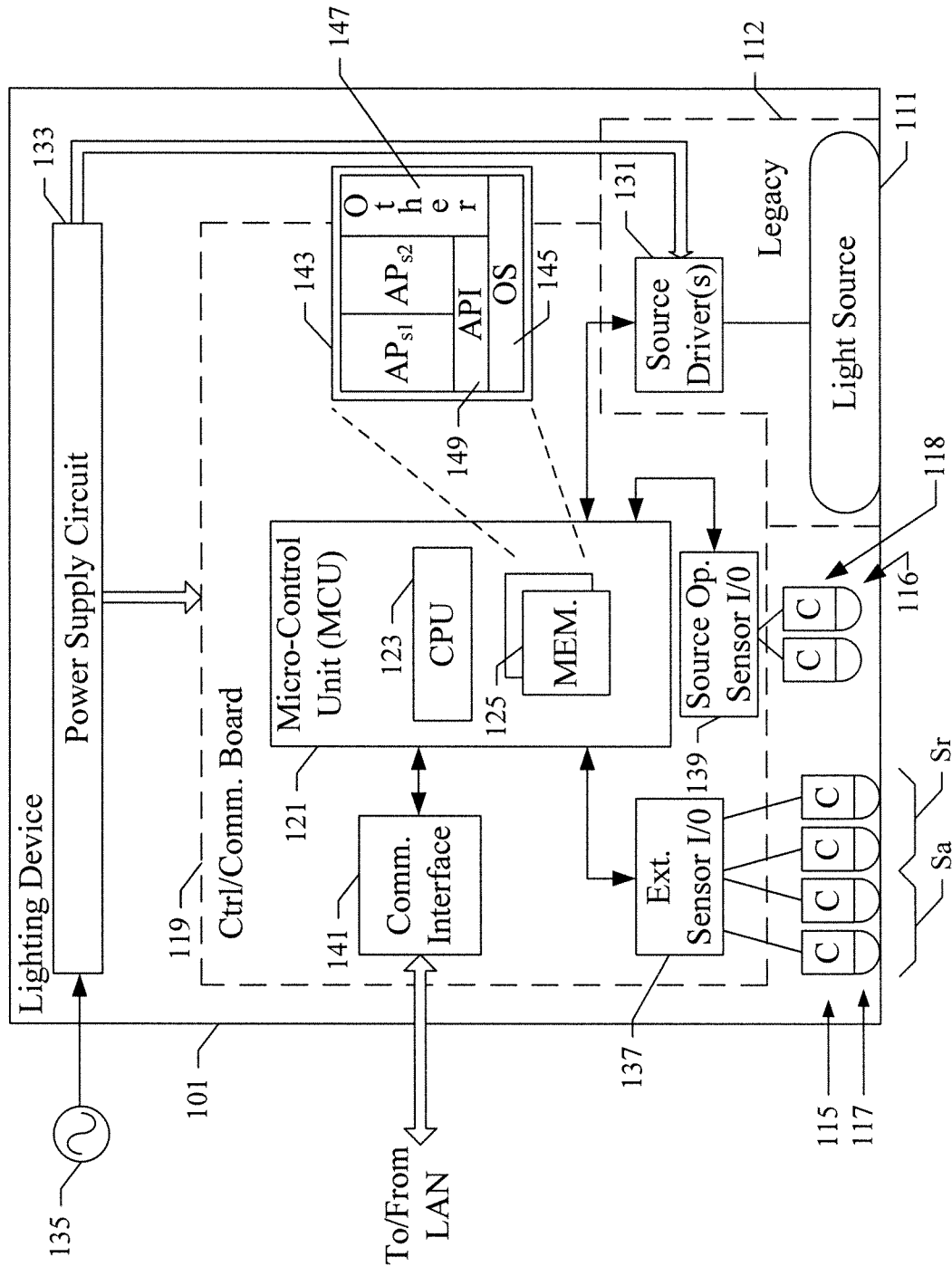
FIG. 1 is a functional block diagram of the elements in a first example of an intelligent lighting device.
Figure 2:
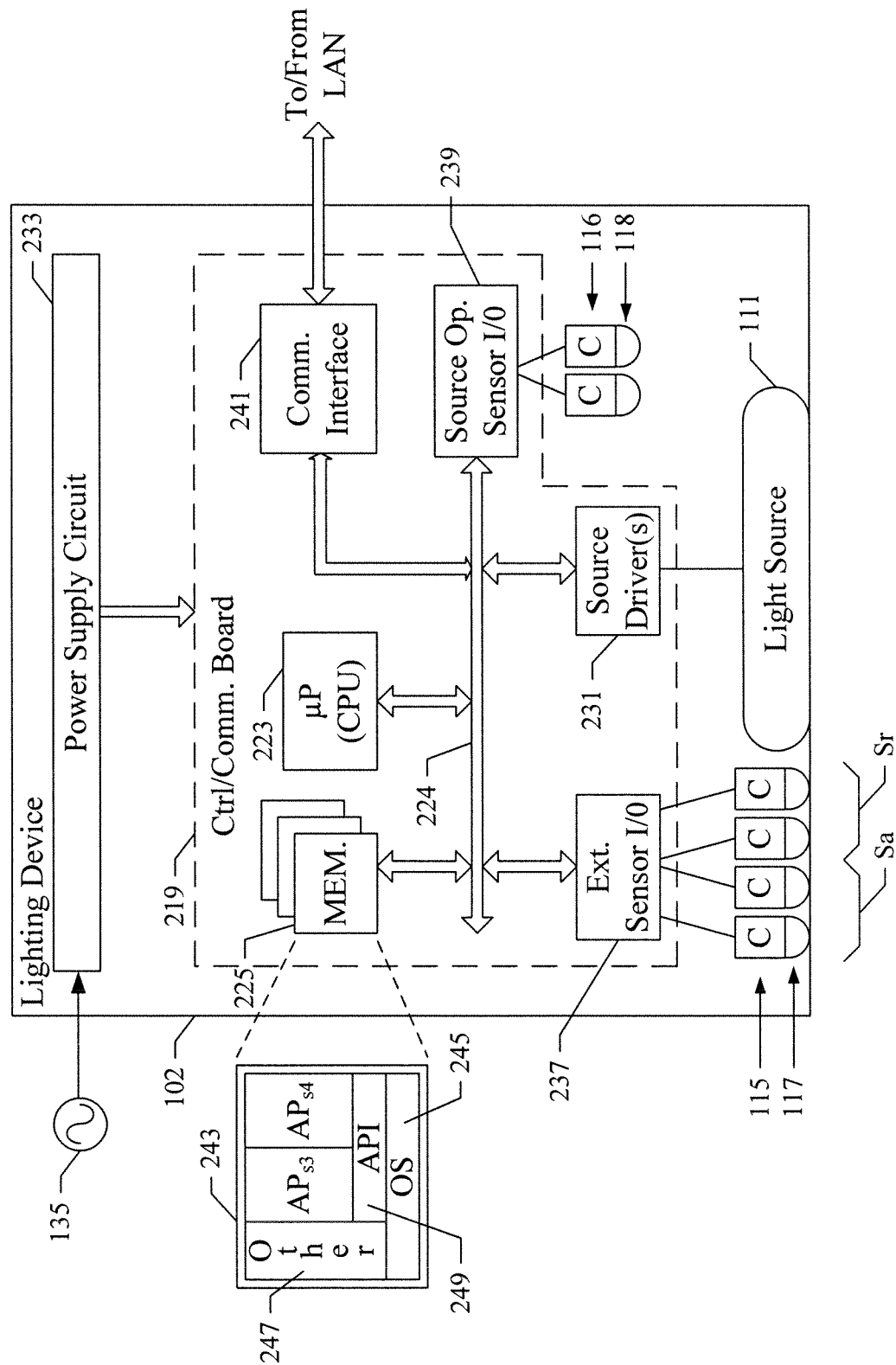
FIG. 2 is a functional block diagram of the elements in a second example of an intelligent lighting device.

FIG. 1 shows a first example 101 of an intelligent lighting device based on use of a microcontroller as the device control element, whereas FIG. 2 shows a second example 102 of an intelligent lighting device based on use of a microprocessor (μP) as the device control element. Also, the first example utilizes a legacy light source, whereas the second example utilizes an incorporated source, e.g. as might be used in a new design or installation. Similar elements in these two examples are identified by like reference numerals.

Considering first the example of FIG. 1, the lighting device 101 includes a light source 111 implemented as part of a legacy installation 112. For example, the legacy installation 112 may be an existing type of street lamp or light fixture utilizing an older more conventional type of source. In such a case, some or all of the other elements of the lighting device 101 may be configured as a module coupled to the light source 111 in the legacy installation 112, e.g. as added to a light fixture previously configured to support the light source 111. In the example, the control elements control the light source 111. The light source 111 in the legacy installation 112 could be separately controlled (e.g. by a legacy control system or element, such as a switch). In this later situation, the added elements of the device 101 would mainly provide monitoring and communication functions from the location of the lighting device 101.

The exemplary lighting device 101 includes one or more sensor couplings and one or more sensors as well as communication and control electronics. For the legacy installation 112 of the source 111, the other elements of the lighting device 101 are configured as a module coupled to the light source 111, e.g. as may be added to a light fixture previously configured to support the light source and coupled to the source 111 via existing control and/or power connections of the source.

In the example of device 102 in FIG. 2, the light source 111 is integrated into the fixture or the like, in a unified configuration together with the one or more sensor couplings, one or more sensors and the communication and control electronics. Although the source 111 in the device 102 may be any suitable type of light source, many such devices will utilize the most modern and efficient sources available, such as solid state light sources, e.g. LED type light sources.

Each lighting device 101 or 102 is configured to sense at least one external condition not related directly to operations or communications of the lighting device. As discussed more later, each device also has an interface for communications with other system elements. Hence, a lighting device 101 or 102 may have as few as one coupling 115 and one associated external condition sensor 117. In the examples discussed herein, each lighting device 101 or 102 includes a number of sensor couplings 115 and associated sensors 117.

The condition or conditions detected by sensors 117 are external in that they relate to some aspect observable in the environment around and near the lighting device 101 or 102 other than those relating to the feedback, normal lighting control and/or communications of the device 101 or 102. Although more examples will be discussed later, a few examples of conditions that may be detected via external sensing include ambient temperature, humidity, air pressure and wind speed in the surrounding environment; images of nearby objects; motion outside the fixture; gases and other substances in the atmosphere; and temperature and moisture on objects within some distance range of the fixture 11. As such, some of the external conditions, like air temp, air quality, and vibration, relate to ambient conditions around or near the fixture itself; whereas other external conditions, like reflected or directed light, or like an image or a video of a distant object, relate to external remote conditions that exist at some distance from fixture.

The examples thus include one or more sensors Sa of types for sensing or detecting an ambient external condition and one or more sensors Sr of types for sensing or detecting a remote external condition. Examples of external ambient condition sensors Sa include a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor. By way of another example, a lighting device 11 may include an ambient sensor Sa in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis of vibration measurements, for example, might indicate an earthquake and the area and magnitude of the impact. Examples of external remote condition sensors Sr include a directional light sensor, a video or still image sensor, and a sound detector. Some of the ambient and remote sensors may be optical devices, each for sensing one or more characteristics of light in the ultraviolet, visible or infrared portions of the electromagnetic spectrum. Optical remote condition sensor devices may be used, for example, for sensing direction of light and determining position of an object as described in U.S. Pat. Nos. 6,043,873 and 5,705,804 both by Ramer et al. Other examples of remote condition optical sensors include linear and two-dimensional imaging devices.

In these examples (FIGS. 1 and 2), each external condition sensor coupling 115 is configured to present a standardized sensor connection interface that is compatible with different types of sensors. In that way, one standardized configuration of the coupling 115 may be used with different types of sensors. Within any one fixture, there may be one, two or more couplings 115 configured to the same standard as well as one, two or more other couplings 115 configured to one or more additional standards. Any sensor connection interface supported through a coupling 117 is standardized across at least a number of different lighting devices 101 or 102 in that the different devices have similar couplings that support the same connection and associated electrical aspects of the coupling standard. However, the standardized connection interface in the various lighting devices also is compatible with a plurality of different types of sensors. Each sensor 117 connects to the standardized connection interface of one of the sensor couplings 115. Each sensor 117 is a device of one of the types compatible with the standardized interface provided through a standardized coupling 115.

Although the couplings 115 may support two or more standards for the sensors, as noted, for purposes of further discussion of the examples of FIGS. 1 and 2, all of the couplings 115 in one device 101 or 102 provide the same standardized interface for various types of sensors 117. In either of the multi-sensor examples, Sr sensors may sense the same remote condition or different remote conditions. Similarly, the Sa sensors may sense the same or different ambient conditions. Hence, there is at least one first type sensor located so as to sense a first one of a number of conditions external to the lighting device not directly related to operation of the lighting device and at least one second sensor of a second one of the types different from the first type that is located so as to sense a second one of the conditions external to the lighting device not directly related to operation of the lighting device. Each Sa sensor connects to the standardized interface of one of the couplings 115, and each Sr sensor connects to the standardized interface of another one of the couplings 115. Each of the sensors Sa and Sr is configured to output a signal responsive to the respective sensed condition via the standardized connection interface of the respective sensor coupling 115.

Intelligent lighting devices of the type discussed herein may have only the one or more external condition sensors 117. However, the specific examples 101 and 102 illustrated in FIGS. 1 and 2 also include one or more couplings 116 and sensors 118 to detect a condition related to operation of the lighting device. A device 101 or 102 may include one or more feedback sensors for sensing operational conditions, such as source or circuit temperature, light output intensity, or one or more other characteristics of the light produced by the source, which relate to operation of the lighting device. Such sensors may provide a local or internal feedback loop at the lighting device 101 or 102 or may enable communication regarding the additional condition to another device over a network and associated light source control based on receiving responsive commands from the other device. Some or all of the lighting devices may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the lighting devices. Examples of sensors 118 to detect a condition related to operation of the lighting device 101 or 102 include a sensor for detecting temperature of one or more components of the lighting device, a feedback light sensor for detecting intensity or other characteristic of light produced by the lighting device, an occupancy sensor for detecting a condition indicative of occupancy of a region to be illuminated by the lighting device and an ambient light sensor for detecting ambient light near the lighting device. In the examples of FIGS. 1 and 2, the illustrative devices 101 and 102 each include one or more couplings 116 and one or more internal condition sensors 118.

The couplings 116 may be standardized in a manner similar to the couplings 115, or the couplings 116 may be uniquely configured for each respective type of sensor 118. In the example, we will assume that the couplings 116 present a standardized sensor connection interface that is compatible with different types of internal condition sensors. The standard may be the same as or different from the standardized interface(s) of couplings 115. Each sensor 118 in turn is configured to connect to and provide condition responsive signaling via the standardized interface of the coupling 116. As discussed more later, this third category of sensor provides signal(s) used to enable control of operation of the light source at least in part based on the condition(s) sensed by the sensor(s) 118.

A "sensor" may be as simple as a condition responsive transducer for generating an electrical signal bearing a known relationship to the amount or degree or the like of a particular condition that the transducer detects. However, most implementations, particularly those in the examples, utilize sensors that include at least some circuitry for processing the output of the transducer(s) included as part of the sensor. The circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The electronics of such a sensor may also receive and respond to a signal received from the I/O interface on the board.

Each exemplary lighting device 101 or 102 also includes a processor coupled to the sensor couplings 115 for processing data responsive to the signals from the sensors 117. However, the two examples utilize different processor implementations.

Consider first the example of FIG. 1. There, the lighting device 101 also includes processing and communications elements, in this case implemented on a control/communication (Ctrl./Comm.) board 119. The lighting device 101 includes a Micro-Control Unit (MCU) 121, which implements the control logic for the device 101, that is to say, controls operations of the device 101. The MCU 121 may be a microchip device that incorporates a processor serving as the programmable central processing unit (CPU) 123 of the MCU and thus of the lighting device 101 as well as one or more memories 125 accessible to the CPU 123. The memory or memories 125 store executable programming for the CPU 123 as well as data for processing by or resulting from processing of the CPU 123. The MCU 121 may be thought of as a small computer or computer like device formed on a single chip. Such devices are often used as the configurable control elements embedded in special purpose devices rather than in a computer or other general purpose device. A variety of PIC16 and PIC32 type MCU chips, for example, may be used as the MCU 121 in the lighting device 101.

As noted, the lighting device 101 includes a source 111, which in the example of FIG. 1 is part of a legacy type installation 112. Power is supplied to the source 111 by an appropriate driver 131. The source driver 131 may be a simple switch controlled by the MCU, for example, if the source 111 is an incandescent bulb or the like that can be driven directly from the AC current. Although the driver 131 could be an element on the control/communication (Ctrl./Comm.) board 119, in the example, the source driver 131 is a part of the legacy installation 112 of the source 111, for example, the ballast in an otherwise conventional fluorescent light fixture. Power for the lighting device 101 is provided by a power supply circuit 133 which supplies appropriate voltage(s)/current(s) to the control/communication (Ctrl./Comm.) board 119 and provides appropriate power to the source driver 131 to power the light source 111. Although shown separately for convenience, the components of the power supply circuit 133 may be mounted on the same board 119 as the control and communication components, depending on considerations such as board/housing space, heat generation, etc. In the example, the power supply circuit 133 receives electricity from alternating current (AC) mains 135, although the lighting device may be driven by a battery or other power source for a particular application. Although not shown, the device 101 may have or connect to a back-up battery or other back-up power source to supply power for some period of time in the event of an interruption of power from the AC mains 135.

The source driver circuit 131 receives a control signal as an input from the MCU 121, to at least turn the source 111 ON/OFF. Depending on the particular type of source 111 and associated driver 131, the MCU input may control other characteristics of the source operation, such as dimming of the light output, pulsing of the light output to/from different intensity levels, color characteristics of the light output, etc. If the source and/or driver circuit have the capability, the driver circuit 131 may also provide some information back as to the operation of the light source 111, e.g. to advise the MCU 121 of the actual current operating state of the source 111.

As outlined earlier, the lighting device 101 includes external condition sensors 117 connected to standardized couplings 115 as wells as sensors 116 for sensing conditions related to operations of the source 112 and associated sensor couplings 118. The couplings 115, 118 provide physical connections, electrical signal connections and any power connections that may be necessary to the respective sensors 117, 116. Physical and electrical connection aspects of each coupling 115, 118 will conform to relevant aspects of the applicable sensor coupling standard. The electrical power and electrical signal communication from and/or to the sensors, in accordance with the electrical aspects of the applicable sensor coupling standard, are provided by appropriate input/output (I/O) circuitry connected between the coupling and the MCU 121. On the MCU side, the I/O circuitry provides a signaling link to a port of the MCU 121 and conforms to the signaling standard for that port. Depending on the design implementation for a particular lighting device 101, I/O circuitry may include a separate circuit for each coupling, two or more I/O circuits for groups of two or more couplings or one I/O circuit for all of the included sensor couplings. In the example of FIG. 1, the I/O circuitry for the sensor couplings 115 is represented by the external sensor input/output (I/O) interface 137; and the I/O circuitry for the sensor couplings 118 is represented by the source operations sensor input/output (I/O) interface 139.

Hence, together, the coupling 115 and the external sensor I/O interface circuitry 137 provide physical and electrical connections as well as electrical power and signal communications for an external condition sensor 117 that conform to the applicable sensor connection interface standard. The signal communications aspects of the standard at least allow the sensor 117 to provide external condition responsive information to the MCU 121. Although the actual sensing element of a sensor may be analog, the information passed to the MCU 121 will typically be in a standardized digital format. The digital format, however, may vary somewhat as between sensor types, based on associated application programming discussed more, later. Preferably, the MCU port connection, the I/O interface circuitry 137 and the interface standard through the coupling 115 also will allow the MCU to control one or more aspects of operation of the sensor 117, e.g. to activate a sensor to sense the applicable condition at a time set by the MCU 121, or to select one of several conditions to be sensed by a mutli-condition type of sensor 117, or to adjust a sensitivity of the sensor 117, etc.

As noted, in the examples, the couplings 118 also support a standardized interface that may be the same as or similar to the interface of the couplings 115. Hence, together, the coupling 118 and source operation-related sensor I/O interface circuitry 139 provide physical and electrical connections as well as electrical power and signal communications for a source operation-related sensor 116 that conform to the applicable sensor connection interface standard. The signal communications aspects of the standard at least allow the sensor 116 to provide source operation-related condition responsive information to the MCU 121. Although the actual sensing element of a sensor may be analog, the information passed to the MCU 121 will typically be in a standardized digital format. The digital format, however, may vary somewhat as between sensor types, based on associated programming. The MCU port connection, the I/O interface circuitry 139 and the interface standard through the coupling 118 may allow the MCU to control one or more aspects of operation of the sensor 116, e.g. to activate a sensor to sense the applicable condition at a time set by the MCU 121, or to select one of several conditions to be sensed by a mutli-condition type of sensor 116, or to adjust a sensitivity of the sensor 116, etc.

The lighting device 101 also includes a communication interface 141 coupled to a communication port of the MCU 121. The interface 141 provides a communication link to a telecommunications network that enables the MCU 121 to send and receive digital data communications through the particular network. The network may be wired (e.g. metallic or optical fiber), wireless (e.g. radio frequency or free space optical) or a combination of such network technologies; and the interface 141 in a particular installation of the device 101 will correspond to the most advantageous network available (based on considerations such as cost and bandwidth) at the location of the installation. In network examples discussed later, the network is a local area network (LAN), therefore the communication interface is of a type for linking to and communication through the available LAN. The communication interface 141 is therefore accessible by the processor/CPU 123 of the MCU 125, and the communication interface 141 is configured to enable the processor to communicate information resulting from one or more functions that the processor performs in response to the various conditions sensed by the sensors 116 and/or 117 through the LAN or other communications network.

As noted, the MCU 121 includes one or more memories 125. The memories 125 store programming for execution by the CPU 123 as well as data to be processed or that has been processed by the CPU 123. The programming is shown in block diagram or module form as a program stack at 143.

The programming 143 includes an operating system (OS) 145 and various application programs, which are resident in the memory and execute on the CPU. The operating system 145 enables execution of the various applications, both for local functions and for communications using the interface 141. Of note for purposes of this discussion, the application software includes the software for implementing the control of the lighting device as well as the software for MCU interaction with the various connected sensors. For discussion purposes, the example shows two application programs $AP_{s1}$, $AP_{s2}$, for controlling lighting device operations with respect to two different types of sensors. One type of sensor may be for one or more of the source operation-related condition sensors 116, but in this example, we will assume that the sensor application program $AP_{s1}$ controls operations in relation to a type of one of the ambient external condition sensors Sa, and the sensor application program $AP_{s2}$ controls operations in relation to a type of one of the remote external condition sensors Sr. Application programs, such as $AP_{s1}$, $AP_{s2}$, are examples of programming for execution by the processor that corresponds at least in part to the type(s) of sensors and controls at least one function of the processor responsive to the condition(s) sensed by the sensor(s). The CPU 123 also will run one or more other application programs 147 from memory 125, to control various other functions of the lighting device 101, such as control of the light source 111, interaction with other types of sensors 116 or 117, and communications through the interface 141.

The programming 143, either as part of the OS 145 or as a complement to the OS 145, implements a standard application programming interface (API) 149 for at least the application(s) relating to external condition sensing. Although not separately shown, the programming 143 may implement the same or different APIs for applications related to the source operation-related condition sensors 116 and/or other applications to be executed through the OS 145 by the CPU 123. An API, such as 149, provides a standard software interface for exchanges between software components, allowing components to communicate and interact. An API standard, for example, can specify command formats, response formats, data structures, etc. In this case, the standard sensor API 149 offered or supported by the OS 145 allows various parties, such as different sensor manufactures, to write application programs AP for the MCU 121 to allow the device 101 to utilize different external condition sensors 117.

The application programs AP and the API 145 also enable the MCU 121 to communicate information or data generated in response to processing of signals or outputs of the sensors 117 so as to implement a standardized application programming interface with respect to the sensor related processing function(s). The information resulting from processing functions of the MCU in turn is communicated through the interface 141 and the network in a manner conforming to the standardized application programming interface. In this way, various devices 101 communicate data relating to various types of sensors through the network in a standardized format that can be readily processed by other equipment that is aware of the format supported by the application programming interface.

Hence, each application program $AP_{s1}$ or $AP_{s2}$ controls one or more functions of the processor (CPU) 123 responsive to the external condition or conditions sensed by the respective type of sensors 117. For example, the programming may control how data regarding the sensed conditions is collected, processed and formatted for communication, e.g. so as to conform to relevant aspects of the standard interface specification and associated API. The programming 143 may also configure the processor/CPU 123 to control the light source 111, either based on internal logic or based on commands received at the device 101 via the network communication. Each application program $AP_{s1}$ or $AP_{s2}$ may control operation in relation to a single one of the sensors 117 or in relation to some number of two or more of the sensors 117 and/or 118.

The application program corresponding to a particular type of sensor enables the processor 123 to receive data representing the condition sensed by the sensor 117 and controls at least one function of the CPU 123 responsive to the condition sensed by the sensor, such as processing of the data for communication via the interface 141 and the network. The control function(s) implemented by execution of the application program for a particular type of sensor may involve other logic in addition or instead of processing for communications. For example, the application program may determine timing for detecting a particular condition or for activating or responding to a particular sensor, e.g. on a periodic basis so as to reduce processing load and/or communication traffic. As another example, the control function relating to a particular condition may involve a threshold, either of a value or a change regarding the sensed condition. A program might cause the MCU 121 to react to detection of more than some set amount of a chemical in the atmosphere as an indication of a harmful condition or to update a reported temperature when the temperature has changed more than a threshold amount. The open nature of the lighting devices 101, provided by the sensor interface and associated API supports use of a wide range of sensor types and an even wider range of program logic for different networked applications of such devices.

Consider next the alternative example of a lighting device 102 shown in FIG. 2. The alternative example of a lighting device 102 includes a somewhat similar source 111. As noted earlier, the source is a new source integrated in a new installation type implementation of the device 102. Although the driver 231 for the source 111 could be separate, in the example, the source driver circuitry 231 may be implemented as part of the control and communication board 219 as shown. As discussed earlier, the lighting device 102 also includes the sensors 116, 117 and couplings 115, 116 as in the device 101 of FIG. 1. Many of the functions/operations of the device 102 are similar to those of device 101, however, the lighting device 102 utilizes a somewhat different control architecture than the MCU based arrangement of the device 101 shown in FIG. 1.

Hence, in the lighting device 102 of FIG. 2, the processing and communications elements on the control/communication (Ctrl./Comm.) board 219 include a microprocessor (μP) 223, which serves as the programmable central processing unit (CPU) of the lighting device 102. The μP 223, for example, may be a type of device similar to microprocessors used in servers, in personal computers or in tablet computers or other general purpose computerized devices. Such a device typically offers more and faster processing capabilities than the CPU of a Micro-Control Unit 121 like that used in the device 101. Unlike the Micro-Control Unit, program and data storage is external; and instead of specially configured ports, the μP 223 is typically configured to communicate data at relatively high speeds via one or more standardized interface buses, represented generally by the bus/arrow 224.

The lighting device includes one or more storage devices, which are accessible by the μP 223 via the bus 224. Although the lighting device 102 could include a hard disk drive or other type of disk drive type storage device, in the example, the device 102 includes one or more memories 225. Typical examples of memories 225 include read only memory (ROM), random access memory (RAM), flash memory and the like. In this example, the memory or memories 225 store executable programming for the μP 223 as well as data for processing by or resulting from processing of the μP 223.

As noted, the lighting device 102 includes a source 111, which in the example of FIG. 2 is an integral part of the device 102. Power is supplied to the source 111 by an appropriate driver 231, in this example, included as a component on the control/communication (Ctrl./Comm.) board 219. Although represented as a single element in the drawing, the driver may comprise a number of elements offering several control channels for different elements of the light source 111. For example, a light emitting diode (LED) implementation of the light source 111 may have individually controlled LEDs or strings of LEDs; and for such an implementation, the driver 231 would consist of several driver circuits providing corresponding independent channels of control. The source driver 231 provides a source of power and associated control by the CPU, in this case by the μP 223, similar to the functions provided by the driver 131 in the device 101 of FIG. 1, except that the driver 231 includes a bus interface that enables the μP 223 to communicate with the source driver 231 via the bus 224.

The lighting device 102 includes a power supply circuit 233 coupled to the AC mains 135, like the supply circuit in the example of FIG. 1, although the circuit 233 and the board 219 will be configured to supply diver voltage/current to the source driver 231 via the board instead of the separate path shown in the example of FIG. 1. As in the earlier example, the lighting device may be driven by a battery or other power source for a particular application, or an AC powered device 102 may have or connect to a back-up battery or the like to supply power for some period of time in the event of an interruption of power from the AC mains 135.

The source driver circuit 231 receives control commands from the μP 223 via the bus 224, to at least turn the source 111 ON/OFF. Depending on the particular type of source 111 and the associated driver 231, the μP 223 commands may control other characteristics of the source operation such as dimming of the light output, pulsing of the light output to/from different intensity levels, color characteristics of the light output, etc. If the source and/or driver circuit have the capability, the driver circuit 231 may also provide some information back as to the operation of the light source 111, e.g. to advise the µP 223 of the actual current operating state of the source 111.

As noted, the lighting device 102 includes external condition sensors 117 connected to standardized couplings 115 as wells as sensors 116 for sensing conditions related to operations of the source 112 and associated sensor couplings 118. The couplings 115, 118 provide physical connections, electrical signal connections and any power connections that may be necessary to the respective sensors 117, 116. Physical and electrical connection aspects of each coupling 115, 118 will conform to relevant aspects of the applicable sensor coupling standard(s). The electrical power and electrical signal communication from and/or to the sensors, in accordance with the electrical aspects of the applicable sensor coupling standard, are provided by appropriate input/output (I/O) circuitry connected between the coupling and the bus 224, much like in the earlier example of FIG. 1.

Hence, the lighting device 102 includes external sensor I/O circuitry 237 and source operation-related sensor I/O circuitry 239. With respect to the respective sensors and couplings, the I/O circuits are similar to the circuits 137 and 139 in the example of FIG. 1. However, each of the circuits 237 and 239 includes a bus interface that enables the µP 223 to communicate with the respective I/O interface circuit 237 or 239 via the bus 224. Each of the circuits 237 and 239 may be configured to provide the electrical interface for one, two or more of the respective sensors via the associated coupling(s).

The lighting device 102 also includes a communication interface 241, which is similar to the communication interface 141 in the earlier example, in that the communication interface 241 provides two way data communication via a network such as a LAN. In the example of FIG. 2, the communication interface 241 is of a type having a bus interface to enable the interface 241 to communicate internally with the µP 223 via the bus 224.

As noted, the lighting device 102 includes one or more memories 225 accessible via the bus 224; and those memories 225 store programming 243 for execution by the µP 223 as well as data to be processed or that has been processed by the µP 223. The programming 243 includes an operating system (OS) 245, an application programming interface (API) 249, sensor type specific applications such as $AP_{s3}$ and $AP_{s4}$, and other application programming, similar to the programming 143 included in the earlier example. However, here, the programming 243 (particularly OS 245 and API 249) is of a type written for the particular type of µP 223. The sensor type specific application programs $AP_{s3}$ and $AP_{s4}$ would be written to conform to the API 249 and to the particular types of sensors included in the lighting device 102.

Again, application programs, such as $AP_{s3}$, $AP_{s4}$, are examples of programming for execution by the processor that corresponds at least in part to the type(s) of sensors and controls at least one function of the processor responsive to the condition(s) sensed by the sensor(s). The µP 223 also will run one or more other application programs 247 from memory 225, to control various other functions of the lighting device 102, such as control of the light source 111, interaction with other types of sensors 116 or 117, and communications through the interface 241.

At least for the external condition sensors 117 and possibly for the source operation-related condition sensors 116, the API 249 provides the standard software interface of the OS to the application programs AP, as in the earlier example. The application programs AP and the API 245 also enable the µP 223 to communicate information or data generated in response to processing of signals or outputs of the sensors 117 so as to implement a standardized application programming interface with respect to the sensor related processing function(s). The resulting information in turn is communicated through the interface 241 and the network in a manner conforming to the standardized application programming interface. In this way, various devices 102 communicate data relating to conditions sensed by various types of sensors 117 and/or 118 through the network in a standardized format that can be readily processed by other equipment that is aware of the format supported by the application programming interface.

Each application program $AP_{s3}$ or $AP_{s4}$ corresponding to a particular type of sensor enables the µP 223 to receive data representing the condition sensed by the sensor 117 and controls one or more functions of the µP 223 responsive to the external condition or conditions sensed by the respective type of sensors, in a manner similar to the application programs AP in the earlier example.

The structure and operation of the intelligent lighting devices 101 and 102, as outlined above, were described by way of example, only.

The examples of FIGS. 1 and 2 utilized monitoring, control and communications elements that were substantially integrated with the fixture and fairly closely coupled to the light source of the fixture so as to control the light source in the fixture. As noted earlier, the device 101 was an integral unit with a new electronically controlled light source such as a asset of LEDs, whereas the device 102 was added to but still controlled a legacy light source. Intelligent lighting devices like those of FIGS. 1 and 2 can take many different forms and can incorporate many different types of light. It may be helpful to consider some examples of structures of lighting devices. A configuration that involves adding monitoring capabilities, intelligence and communications to an existing light fixture (e.g. part of a previously installed infrastructure) will be discussed later. By way of examples, FIGS. 3-6 depict two intelligent lighting devices. In these examples, the light sources, in the form of LEDS, are integrated together with the monitoring, control and communications elements. In that sense, these two examples are similar to the intelligent lighting device 101 of FIG. 1, however, the elements on the control and communication boards may be MCU based like in FIG. 1 or µP based like in FIG. 2.

Figure 3:
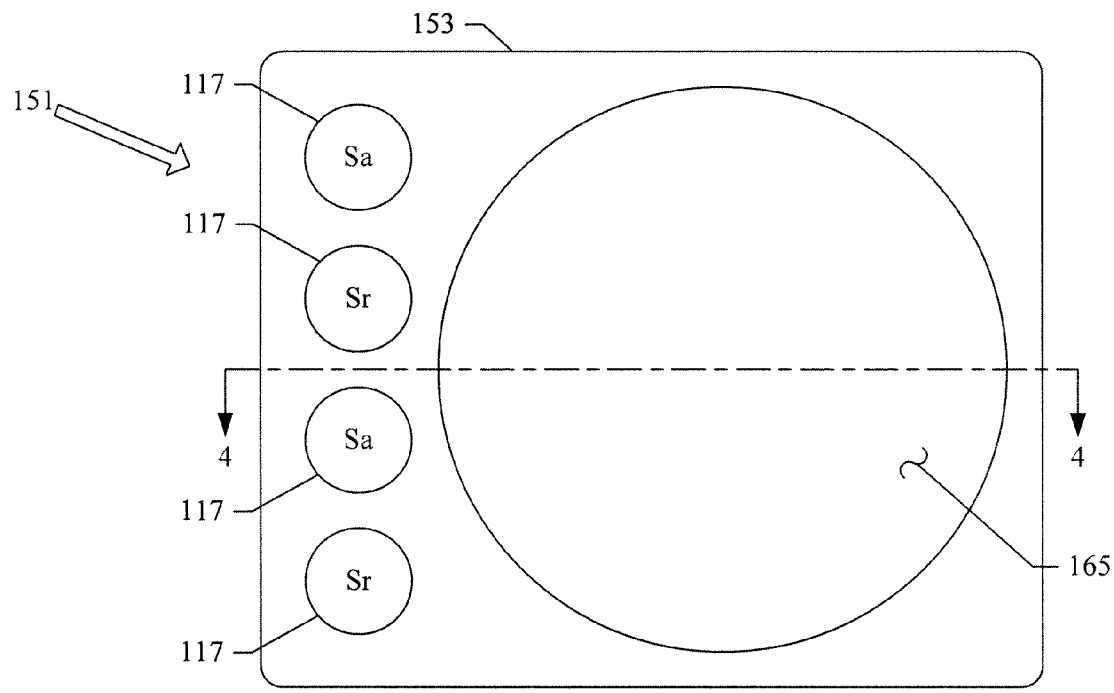
FIG. 3 is a plan view of a first example of an intelligent lighting fixture.
Figure 4:
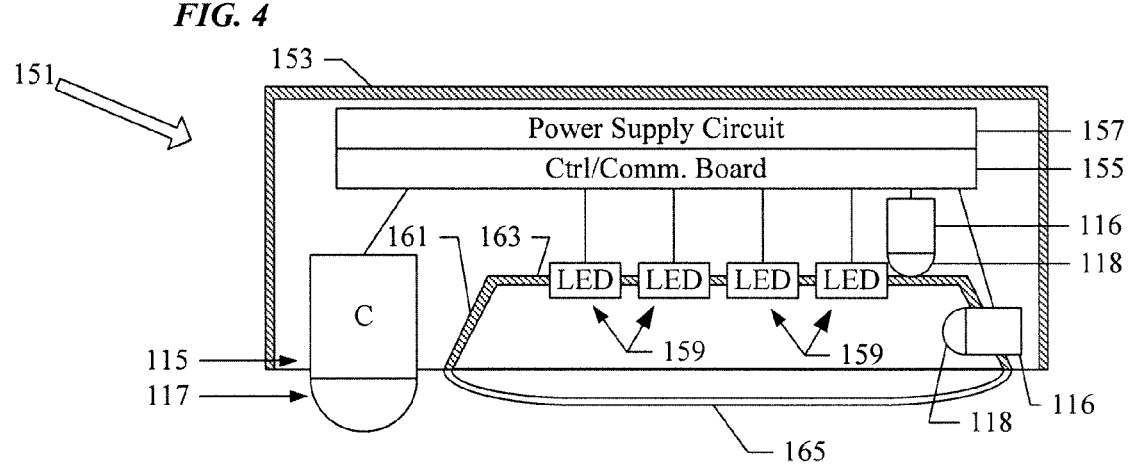
FIG. 4 is a cross-section view of the fixture of FIG. 3 taken along line 4-4.

Consider next the example of the intelligent lighting device 151 of FIGS. 3 and 4. In this example, the lighting device 151 may take the form of a relatively compact 'light engine.' Some of the elements shown in FIGS. 3 and 4 are the same as elements shown in earlier examples. Those similar elements are indicated by the same reference numerals as in the earlier drawings and are discussed again here more briefly, since the reader should be familiar with or able to refer back to the earlier discussion of such elements for additional information regarding such similar elements.

The lighting device 151 includes a number of external condition sensors 117 connected to standardized couplings 115. Although the example shows one sensor connected to each coupling, there may be more couplings than sensors, for example, if a particular device is implemented for a particular installation with less than some maximum designed number of sensors.

The light engine formed by the device 151 includes the couplings 115 and sensors 117 as integral elements of the light engine. The device 151 includes a housing 153. Since the sensors 117 are integral, in the illustrated configuration, the sensors 117 are attached to couplings through apertures in a wall of the housing 153 to detect one or more external conditions, as discussed earlier. Although the device 151 may have fewer or more sensors of the same or different types, the example shows that two of the sensors 117 are ambient external condition sensor types Sa and two of the sensors 117 are remote external condition sensor types Sr. Instead of the integral arrangement of all of the couplings and sensors, one or more of the couplings/sensors could be mounted separately and connected to the light engine part of the device 151.

The couplings 115 provide physical connections, electrical signal connections and any power connections that may be necessary to the external condition sensors 117. Physical and electrical connection aspects of each coupling 115 will conform to relevant aspects of the applicable sensor coupling standard(s).

The lighting device 151 may further include one or more sensors 118 and associated couplings 116 the same as or the sensors 116 and couplings 118 for sensing one or more conditions that relate to operation of the light source in the examples of FIGS. 1 and 2. The couplings 116 provide physical connections, electrical signal connections and any power connections that may be necessary to the sensors 118. Physical and electrical connection aspects of each coupling 116 may conform to relevant aspects of an applicable sensor coupling standard.

The lighting device 151 also includes processing and communications elements, represented collectively in the high-level functional block diagram of FIG. 4 by the control/communication (Ctrl./Comm.) board 155. These elements, for example, include a processor, which is coupled to the sensor coupling(s) 115 in the lighting device 151, for processing data responsive to the signal from each included external condition sensor 117. As in the earlier examples, the elements on the control/communication board 155 also include a memory, accessible to the processor, which stores programming for execution by the processor and data for processing or that has been processed by the processor during program execution. The intelligent lighting device 151 further includes a communication interface accessible by the processor. The elements implemented on the board 155 also include sensor I/O circuitry as in the earlier examples. As discussed below, the integral light source in the device 151 includes a number of LEDs. Power for the LEDs is supplied appropriate driver circuitry implemented as part of elements of the control/communication (Ctrl./Comm.) board 155. The elements of the control/communication (Ctrl./Comm.) board 155 may be implemented, for example, in a manner similar to the elements on board 119 (FIG. 1) or in a manner similar to the elements on board 219 (FIG. 2).

Power for the lighting device 151 is provided by a power supply circuit 157 which supplies appropriate voltage(s)/current(s) to the control/communication (Ctrl./Comm.) board 155, and the driver circuitry on the board 155 that provides appropriate power to the LEDs forming the light source. Although shown separately for convenience, the components of the power supply circuit 157 may be mounted on board 155. In most examples, the power supply circuit 157 receives electricity from alternating current (AC) mains, although the lighting device 151 may be driven by a battery or other power source for a particular application and/or may have or connect to a back-up battery or other back-up power source to supply power for some period of time in the event of an interruption of power from the AC mains.

The device 151 is shown in FIG. 4 in an orientation for emitting light downward, as might be suitable for a down-lighting application. Of course, the device 151 may be oriented in other directions for other lighting applications.

As noted, in the device 151 includes a number of LEDs forming the light source. FIG. 4 depicts the LEDs at 159. The LEDs 159 may all be of the same type, e.g. all the same type of white light emitters. Alternatively, there may be two, three or more different types of LEDs. Combinations of LED types can be used to provide a blended white light of desired characteristics or a tunable color light output. The number and types of drivers as well as the programming for the processor, would be somewhat different for different combinations of LEDs.

Various arrangements of the LEDs, reflectors and optics may be used to configure the light output for intended applications. In the example of FIGS. 3 and 4, the intelligent lighting device 151 includes a reflector having a conical section 161, with the LEDs mounted on a base section 163. The reflector may be specular, although in the example, some or all of the interior of the reflector exhibit a diffuse reflectivity. The reflector may be formed in any manner that provides desired reflectivity in a cost effective manner, for example, of a metal shell having white paint or other coating on the surfaces intended to be reflective. Another option is to form the reflector of a white plastic or the like.

Although a separate circuit board is not shown for convenience, the LEDs 159 are typically mounted on such a board arranged so as to position the LEDs 159 in (or to emit light through) openings or apertures through the reflector. In the example, the LEDs 159 emit light through apertures in the base 163 of the reflector.

The opposite end of the conical section 161 of the reflector could be open. In the example, however, the opposite end of the conical section 161 of the reflector is closed or covered by a light transmissive element, such as a translucent white diffuser 165. Although shown as convexly curved outward away form the interior of the reflector and the LEDs, the diffuser may have other shapes, such as a flat shape or a concave shape. Also, opposite surfaces of the diffuser may have similar shapes as shown or different shapes. The reflective surfaces of the reflector sections 161, 163 and the translucent white diffuser 165 together create a conically shaped volume or cavity for the light engine of the device 151. The LEDs 159 emit light into this volume, and the light is mixed by reflections within the cavity and by diffusion as the light emerges from the cavity through the diffuser 165.

Figure 5:
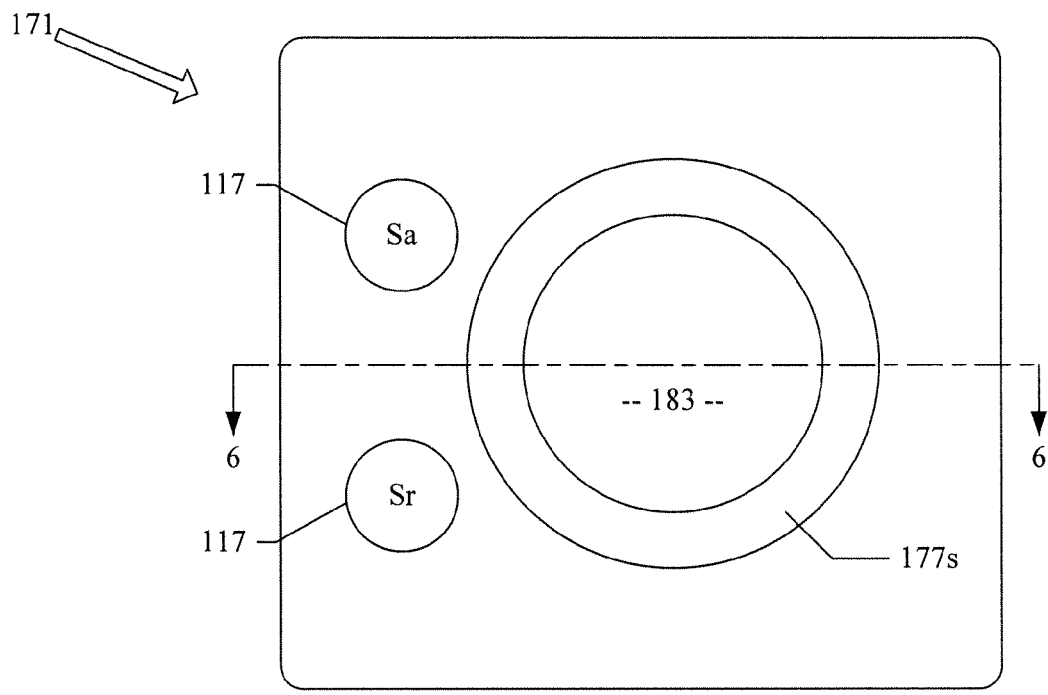
FIG. 5 is a plan view of a second example of an intelligent lighting fixture.
Figure 6:
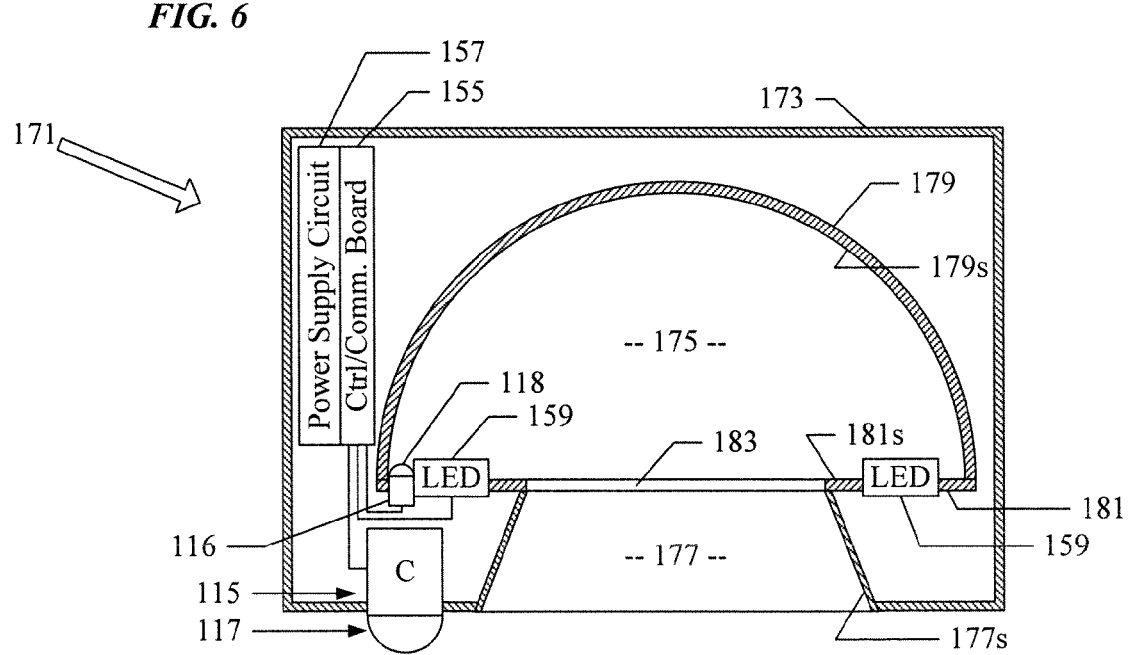
FIG. 6 a cross-section view of the fixture of FIG. 5 taken along line 6-6.

FIGS. 5 and 6 show another example 171 of an intelligent lighting fixture. Many of the elements of the device 171 of FIGS. 5 and 6 are the same as elements shown in earlier examples, particularly the example of FIGS. 3 and 4. Those similar elements are indicated by the same reference numerals as in the earlier drawings and are discussed again here more briefly, since the reader should be familiar with or able to refer back to the earlier discussion of such elements for additional information regarding such similar elements.

As in the earlier examples, the lighting device 171 includes a number of external condition sensors 117 connected to standardized couplings 115. Although the example shows one sensor connected to each coupling, there may be more couplings than sensors, for example, if a particular device is implemented for a particular installation with less than some maximum designed number of sensors. The light engine formed by the device 171 includes the couplings 115 and sensors 117 as integral elements of the light engine, although the couplings and sensors may be somewhat separately mounted for some applications and/or for sensing some particular external conditions. There may be one, two or any higher number of external condition sensors 117 and associated couplings 115. The example shows one of the sensors 117 as an ambient external condition sensor type Sa and another of the sensors 117 as a remote external condition sensor type Sr.

The device 171 includes a housing 173. Since the sensors 117 are integral, in the illustrated configuration, the sensors 117 are attached to couplings through apertures in a wall of the housing 153 to detect one or more external conditions, as discussed earlier. The couplings 115 provide physical connections, electrical signal connections and any power connections that may be necessary to the external condition sensors 117. Physical and electrical connection aspects of each coupling 115 will conform to relevant aspects of the applicable sensor coupling standard(s).

The lighting device 171 may further include one or more sensors 118 and associated couplings 116 the same as or the sensors 116 and couplings 118 for sensing one or more conditions that relate to operation of the light source in the examples of FIGS. 1 and 2. The couplings 116 provide physical connections, electrical signal connections and any power connections that may be necessary to the sensors 118. Physical and electrical connection aspects of each coupling 116 may conform to relevant aspects of an applicable sensor coupling standard.

The lighting device 171 also includes processing and communications elements, represented collectively in the high-level functional block diagram of FIG. 6 by the control/communication (Ctrl./Comm.) board 155. These elements, for example, include the processor, memory communication interface, sensor I/O circuit(s) and LED driver circuitry as in the example of FIGS. 3 and 4. Again, the elements of the control/communication (Ctrl./Comm.) board 155 may be implemented, for example, in a manner similar to the elements on board 119 (FIG. 1) or in a manner similar to the elements on board 219 (FIG. 2). Power for the lighting device 171 is provided by a power supply circuit 157 which supplies appropriate voltage(s)/current(s) to the control/communication (Ctrl./Comm.) board 155, including for the driver circuitry that provides appropriate power to the LEDs forming the light source. Although shown separately for convenience, the components of the power supply circuit 157 may be mounted on board 155. In most examples, the power supply circuit 157 receives electricity from alternating current (AC) mains, although the lighting device 151 may be driven by a battery or other power source for a particular application and/or may have or connect to a back-up battery or other back-up power source to supply power for some period of time in the event of an interruption of power from the AC mains.

The device 171 is shown in FIG. 6 in an orientation for emitting light downward, as might be suitable for a downlighting application. Of course, the device 171 may be oriented in other directions for other lighting applications.

As the example of FIGS. 3 and 4, in the intelligent lighting device 171 includes a number of LEDs 159 forming the light source. Again, the LEDs 159 may all be of the same type, e.g. all the same type of white light emitters. Alternatively, there may be two, three or more different types of LEDs. Combinations of LED types can be used to provide a blended white light of desired characteristics or a tunable color light output. The number and types of drivers as well as the programming for the processor, would be somewhat different for different combinations of LEDs.

To this point in our discussion, the device 171 is quite similar to the device 151. However, as shown particularly in FIG. 6, the device 171 uses different optical elements to process the light emitted by the LEDs 159.

The example of FIG. 6 utilizes a primary optic in the form of a diffusely reflective optical integrating cavity 175 in combination with a secondary optic in the form of a specular or diffusely reflective deflector of concentrator 177. Although the cavity 175 may take different forms, in the example, the cavity 175 is formed by a dome 179 and a plate 181. The cavity 175 has a diffusely reflective interior surface 179s and/or 181s and a transmissive optical passage 183. The passage 183 is transmissive with respect to light emitted by the LEDs 159. The passage may be an actual opening, or the passage 183 may be an optical aperture that is physically closed but allows transmission of light of the appropriate wavelength range from the cavity 175 into the region or area to be illuminated by the device 171. For example, the passage may be formed by a transparent or translucent member of portion of the plate 181. Although not shown, the passage 183 may be at other locations and/or there may be additional passages allowing emission in other directions.

The LEDs 159 may be positioned at a variety of different locations and/or oriented in different directions. Various couplings and various light entry locations may be used. In this cavity example, each LED 159 is coupled to supply light to enter the cavity 175 at a point that directs the light toward a reflective cavity surface so that the LED emissions reflect one or more times inside the cavity 175, and at least one such reflection is a diffuse reflection. As a result, the direct emissions from the source LEDs 159 would not directly pass through the optical output passage 183 of the cavity 175. In examples where the passage 183 is open or transparent, the points of emission into the cavity 175 from the LEDs 159 are not directly observable through the passage 183 from the region illuminated by the output of the lighting device 171. The LEDs 159 therefore are not perceptible as point light sources of high intensity, from the perspective of an area illuminated by the intelligent lighting device 171.

The cavity 175 may have various shapes. The illustrated cross-section would be substantially the same if the cavity is hemispherical or if the cavity is semi-cylindrical with a lateral cross-section taken perpendicular to the longitudinal axis of the semi-cylinder. For purposes of the discussion, the cavity 175 in the device 171 is assumed to be hemispherical or nearly hemispherical. In such an example, a hemispherical dome 179 and a substantially flat cover plate or mask 181 form the optical cavity 175. Although shown as separate elements, the dome 179 and plate 181 may be formed as an integral unit. The plate 181 is shown as a flat horizontal member, for convenience, although curved or angled configurations may be used. At least the interior facing surface(s) 179s of the dome 179 is highly diffusely reflective, so that the resulting cavity 175 is highly diffusely reflective with respect to the radiant energy spectrum produced by the device 171. The interior facing surface(s) 181s of the plate 181 is reflective, typically specular or diffusely reflective. In the example, the dome 179 itself is formed of a diffusely reflective material, whereas the plate 181 may be a circuit board or the like on which a coating or layer of reflective material is added or mounted to form the reflective surface 181s.

For efficiency, it is desirable that the diffusely reflective cavity surface(s) have a highly efficient reflective characteristic, e.g. a reflectivity equal to or greater than 90%, with respect to the relevant wavelengths. The entire interior surface (surfaces 179s, 181s of the dome and plate) may be diffusely reflective, or one or more substantial portions may be diffusely reflective while other portion(s) of the cavity surface may have different light reflective characteristics. In some examples, one or more other portions are substantially specular or are semi or quasi specular.

Hence, in this example, the cavity 175 forms an integrating type optical cavity. The transmissive passage or optical aperture 183 allows emission of light generated by the LEDs 159 that has been reflected, diffused and thereby integrated light within the interior of the cavity 175 from the cavity 175 into a region to facilitate a humanly perceptible general lighting application for the device 171. Although shown at approximately the center of the plate 181, the opening or aperture forming transmissive passage 183 may be located elsewhere along the plate or at some appropriate region of the dome. In the example, the passage 183 forms the virtual source of the light from lighting device 171.

The transmissive passage or optical aperture 183 may serve as the light output if the lighting device 171, directing integrated light of relatively uniform intensity distribution to a desired area or region to be illuminated in accordance with the general lighting application. It is also contemplated that the lighting device 171 may include one or more additional processing elements coupled to the aperture, such as a colliminator, a grate, lens or diffuser (e.g. a holographic element). In the example, the intelligent lighting device 171 includes a further optical processing element in the form of the deflector or concentrator 177 coupled to the optically transmissive passage 183, to distribute and/or limit the light output to a desired field of illumination.

The deflector or concentrator 177 has a reflective inner surface 177s, to efficiently direct most of the light emerging from the cavity 175 into a relatively narrow field of view. A small opening at a proximal end of the deflector 177 is coupled to the optically transmissive passage 183 of the optical integrating cavity 175. The deflector 177 has a larger opening at a distal end thereof. Although other longitudinal cross-sectional shapes may be used, such as various curved reflector shapes (e.g. parabolic or elliptical), the deflector 177 in this example is conical, essentially in the shape of a truncated cone (straight-sided when shown in cross-section). The angle and/or curvature of the cone wall(s) and the size of the distal opening of the conical deflector 177 define an angular field of light energy emission from the device 171. Although not shown, the large opening of the deflector 177 may be covered with a transparent plate or lens, or covered with a grating, to prevent entry of dirt or debris through the cone into the fixture 171 and/or to further process the output light energy.

The deflector 177 comprises a reflective interior surface 177s between the distal end and the proximal end. In some examples, at least a substantial portion of the reflective interior surface 177s of the conical deflector 177 exhibits specular reflectivity with respect to the integrated radiant energy. However, for some applications, it may be desirable to construct the deflector 177 so that at least some portion(s) of the inner surface 177s exhibit diffuse reflectivity or exhibit a different degree of specular reflectivity (e.g., quasi-secular), so as to tailor the performance of the deflector 177 to a particular lighting application. For other applications, it may also be desirable for the entire interior surface 177s of the deflector 177 to have a diffuse reflective characteristic.

The conical deflector 177 may have a variety of different shapes, depending on the particular lighting application. In the example, where cavity 175 is hemispherical, the lateral cross-section of the conical deflector 177 (horizontal across the drawing in the illustrated orientation) would typically be circular. Hence, as shown in FIG. 5, the passage and corresponding proximal opening of the deflector 177 as well as the distal opening of the deflector 177 are circular. However, the deflector 177 may be somewhat oval in lateral shape. Although the passage 183 may be round, the distal opening may have other shapes (e.g. oval, rectangular or square); in which case, more curved deflector walls provide a transition from round at the passage coupling to the alternate shape at the distal opening. In applications using a semi-cylindrical cavity, the deflector may be elongated or even rectangular in cross-section. The shape of the aperture 183 also may vary, but will typically match the shape of the small end opening of the deflector 177.

As a practical matter, the size of the cavity 175 is optimized to provide effective integration or combination of light from the desired number of LED type solid state sources 159. The size, angle and shape of the deflector 177 determine the area that will be illuminated by the combined or integrated light emitted from the device 171.

In the example, the sensor 118 is oriented to receive and detect some of the reflected light within the cavity 175. For example, the sensor may detect the intensity and/or color characteristics of the integrated light.

Although not shown, either of the lighting devices 151 and 171 may include an opto-luminescent materials, such as a phosphor to convert some of the energy in a particular wavelength region emitted from the LEDs into visible light of different wavelength(s), to supplement or enhance the characteristics of the integrated light output lighting device for a particular application. Also, the cavities in the devices 151 and 171 are shown as empty spaces. It is also contemplated that such a cavity may be partially or completely filed by another element or material, e.g. solid optical element or a container for a light transmissive liquid.

The structure and operation of the intelligent lighting devices 151 and 171, as outlined above, were described by way of example, only.

The examples of FIGS. 1-6 utilized monitoring, control and communications elements that were substantially integrated with the fixture and fairly closely coupled to the light source of the fixture. In those examples, elements were provided that sensed conditions related to light source operation and could respond based on internal logic and/or commands from higher level control computers (e.g. to control the light source). However, other configurations are contemplated, for example, that may not utilize the elements on the board to control the light source, may provide additional output or control capability based on internal logic and/or commands from higher level control computers and/or to provide communication connectivity to other devices in the vicinity (e.g. for communication of other devices through the network(s) of FIG. 9, which will be discussed later). In many cases where there is an installed base of light fixtures, it may be practical to add a module providing monitoring and communication capabilities to each existing fixture to add the desired intelligence, etc.

FIGS. 7 and 8 relate to such an example of a lighting device 311 in which the monitoring and communication elements are implemented in a module 312 separate, which is attached to or mounted in the vicinity of a light fixture 313. However, the light fixture 313 in this example is a legacy fixture, and the elements within the module 312 do not control the light source 314 included with the associated fixture 313. The light fixture 313 and the module 312 together, in this example, form the lighting device 311. FIG. 7 shows the elements of the lighting device 311, whereas FIG. 8 is a block diagram illustration of the electronic elements of the monitoring and communication module 312.

The example of FIG. 7 utilizes a cobra-head type device as the light fixture 313. The cobra-head fixture is attached to a beam or arm 315 supported by a lamp post or light pole 316, although other mounting structures may be used. Light fixture implementations and mounting arrangements like those shown in FIG. 7 are common in street and parking lot applications. Of course, the monitoring and communication module 312 of FIG. 7 and FIG. 8 may be used with other types of legacy light fixtures and/or in other types of applications.

The light fixture 313 may include any light source 317 that is appropriate for the intended lighting application. The fixture includes a housing 318 that encloses the light source and other elements and provides the mechanical attachment to the supporting beam 315. The housing 318 also supports a transparent or diffusely transmissive cover 319 through which the source 317 emits light.

As in earlier examples, electrical power is obtained from alternating current (AC) mains 135, although the light source 317 may be driven by a battery or other power source for a particular application. AC power lines typically extend up through the pole 316 and the beam 315 and connect to the fixture 313, although such lines are omitted for ease of illustration.

The lighting device 311 also includes a controller 321 for controlling operation of the light source 317. The controller 321 could be external, but in the example, the housing 318 also encloses the controller 321.

Although other more sophisticated control functions may be provided by an appropriate implementation of the controller 321, for discussion purposes, we will assume that the controller simply switches power to the source 317 ON and OFF. Depending on the type of light source 317, the controller 321 may include power conversion circuitry such as a ballast or the like to convert the power obtained from the AC mains 135 to an appropriate voltage/current power for the particular light source 317.

The ON/OFF switching by the controller 321 may be based on a simple input switch, commands received from an external device via the power lines or another device, etc. In the example, the light fixture 313 includes a light sensing transducer 323, such as a photocell. The transducer 323 provides a signal that is related to the intensity of daylight reaching the transducer on the exterior of the fixture 313. The controller 321 in the example turns power to the light source 317ON when the intensity of light detected by the transducer 323 falls to or below a threshold, e.g. to turn ON the source 317 as night is falling. Conversely, the controller 321 turns power to the light source 317 OFF when the intensity of light detected by the transducer 323 reaches a threshold, e.g. to turn OFF the source 317 as the sun rises in the morning. The source is kept ON in the dark of night, and the source is kept off during the daytime when sunlight is fairly plentiful.

In this example, the cobra head light fixture 313 is configured an operates in a conventional manner. The fixture may be an existing device that need not be modified, with respect to power and operational control.

In an implementation where the fixture 313 is a legacy device, the fixture is enhanced or upgraded by the addition of the monitoring and communication module 312. In the example, the module 312 is mounted by attachment to an underside surface of the housing 318 of the cobra head fixture 313. However, the module 312 may be added and mounted in association with the fixture 313 at any location and/or in any manner that is suitable for a particular installation and/or a particular application.

Existing light fixtures such as the fixture 313 have connection to power, represented by the AC mains 135 in the drawing. The module 312 could be supplied power in other ways from other sources, but typically, the module 312 will utilize the existing source of power available at the light fixture, eliminating the need for separate power and/or wiring. Hence, in the example, the module 312 connects to and obtains power from the AC mains already present in the lighting device for powering the light source 317. Although other connections may be used, e.g. depending on the location and/or mounting of the module 312, in the example, the module 312 has a connection to the AC main lines power 135 at a point in the housing of the cobra head light fixture 313.

The monitoring and communication module 312 is a layer L1 lighting device and communicates through a network with L1 layer computers, and data is processed and communicated with the higher layer networks/computers, in the hierarchical system to be discussed later with respect to FIG. 9. With respect to FIG. 7, the simplified illustration shows a network link to/from the monitoring and communication module 312. This link may be wireless, although in the example it is a hard link such as a wire or optical network cable. Any suitable link may be used.

The monitoring and communication module 312 may perform sensor responsive monitoring and related communications only. However, for at least some system installations, it may be desirable to add further functional elements on or near the fixture that operate in some manner via the monitoring and communication module 312. In the example of FIGS. 7 and 8, the additional elements include a local wireless transceiver 325, such as a WiFi access point. The module 312 provides connectivity for the WiFi local wireless data transceiver 325 to the data network used by the module 312. In this way, the lighting device may provide a hotspot for Internet access or the like in the vicinity of the lighting device 311. By providing modules 312 and WiFi access points 325 on various street lamps around a city or enterprise campus, the city or campus can offer outdoor wireless Internet service, e.g. as a public service and/or for use by city or enterprise personnel.

The additional or ancillary devices provided in the vicinity of the light fixture may also include any of a wide range of devices that may be controlled via communications through the network and the monitoring and communication module 312 of the lighting device 311. Just by way of one example, such added equipment on one or more lighting devices 311 may be used to provide information to people in the vicinity of the fixture 313. Messages could be provided via the WiFi access point 325 to user data devices, or by a Bluetooth transceiver (not shown) for example to equipment in passing vehicles.

In the illustrated example, the additionally controlled equipment includes a visible message output device, such as a video monitor or digital sign board, represented generally by the video screen 327. The data network enables communications of commands and/or data to the module 312 to control information output via the video screen 327. The video screen 327, for example, may provide advertising or other information of general interest; or as shown by way of example, the screen may be used to provide a warning of danger or an announcement of instructions to the public in the vicinity of the lighting device 311.

The device 311 may also offer audible information output, and for that purpose, the exemplary device 311 also includes one or more loudspeakers 329. Much like for operation of the video screen 327, the data network enables communications of commands and/or data to the module 312 to control information output via the one or more loudspeakers 329, for any particular purpose deemed suitable by the service provider/operator of a system that includes the intelligent lighting device 311.

Turing now to FIG. 8, we next consider an example of an implementation of the monitoring and communication module 312. The module 312 could be implemented using an MCU based architecture similar to that used in the example of FIG. 1. For purposes of an illustrative example for discussion here, however, FIG. 8 shows an architecture for the module 312 that is based on a microprocessor (μP) and bus architecture similar to that of the example of FIG. 2. Hence, elements shown in FIG. 8 that are the same as elements shown in the example of FIG. 2 use the same reference numerals and are discussed again here more briefly, since the reader should be familiar with or able to refer back to the earlier discussion of such elements for additional information regarding such similar elements.

The monitoring and communication module 312 includes a power supply circuit 233 coupled to the AC mains 135, like the supply circuit in the example of FIG. 2. As in the earlier examples, the module 312 may be driven by a battery or other power source for a particular application, or an AC powered device 312 may have or connect to a back-up battery or the like to supply power for some period of time in the event of an interruption of power from the AC mains 135.

The power supply circuit 233 provides appropriate power to drive the various elements on the control and communication board 331. The power supply circuit 233 may be mounted on the board 331 or a separate unit as shown.

The processing and communications elements on the control/communication (Ctrl./Comm.) board 331 include a microprocessor (μP) 223, which serves as the programmable central processing unit (CPU) of the module 312, and the. The μP 223 is configured to communicate data via one or more standardized interface buses, represented generally by the bus/arrow 224. The monitoring and communication module 312 also includes one or more storage devices, which are accessible by the μP 223 via the bus 224. Although the module 312 could include a hard disk drive or other type of disk drive type storage device, in the example, the device 102 includes one or more memories 22, such as ROM, RAM, flash memory or the like. In this example, the memory or memories 225 store executable programming for the μP 223 as well as data for processing by or resulting from processing of the μP 223. Although not shown in this latest drawing for convenience, the programming stored in the memory or memories 225 include the operation system as well as the application programs (AP) for use with specific sensors.

The monitoring and communication module 312 also includes a communication interface 241, which is similar to the communication interfaces in the earlier examples, in that the communication interface 241 provides two way data communication via an external network such as a LAN. In the example of FIG. 8, like that of FIG. 2, the communication interface 241 is of a type having a bus interface to enable the interface 241 to communicate internally with the μP 223 via the bus 224.

In this example (FIGS. 7 and 8), the monitoring and communication module 312 also supports local wireless communication. As noted in the discussion of FIG. 7, the specific example uses a WiFi type wireless access point transceiver 325 for local wireless data communication with data devices in the vicinity of the intelligent lighting device 311. Hence, the monitoring and communication module 312 includes a second communication interface 333. The interface 333 would be of a standard type configured for local communications with the particular type of device 325. In the example WiFi type example of these drawings, the second communication interface 333 would typically be an Ethernet type LAN interface. An Ethernet capable would provide a connection from the interface 333 in the module 312 to the WiFi type wireless access point 325. Like the interface 241, the second communication interface 333 is of a type having a bus interface to enable the interface 325 to communicate internally with the μP 223 and/or the interface or other elements of the board 331 via the bus 224. For example, under control of the μP 223 when executing programming from the memory or memories 225, the interfaces 333 and 241 may provide two-way data communications for devices utilizing the WiFi type wireless access point 325 to access the Internet. The WiFi type wireless access point 325 and the second communication interface 333 may also enable data devices in the vicinity (with appropriate access privileges) to access the μP 223, e.g. to obtain monitoring data, module operational information or the like and/or to provide control commands and/or new programming to the module 312.

As in the lighting devices in the earlier examples, the lighting device 311 includes external condition sensors 117 connected to standardized couplings 115. In this case the couplings 115 are part of the module 312; and the sensors 117 are attached to and supported together with the module 312. The couplings/sensors could be mounted separately and connected to the module 312. The couplings 115 provide physical connections, electrical signal connections and any power connections that may be necessary to the external condition sensors 117. Physical and electrical connection aspects of each coupling 115 will conform to relevant aspects of the applicable sensor coupling standard(s). The electrical power and electrical signal communication from and/or to the sensors 117, in accordance with the electrical aspects of the applicable sensor coupling standard, are provided by appropriate input/output (I/O) circuitry 237 connected between the coupling and the bus 224, as in the earlier example of FIG. 2. The external sensor I/O circuitry 237 includes a bus interface that enables the μP 223 to communicate with the respective I/O interface circuit 237 via the bus 224. The external sensor I/O circuitry 237 may be configured to provide the electrical interface for one, two or more of the sensors 117 via the associated coupling(s).

Although not shown in this example, the monitoring and communication module 312 may include one or more sensors and associated couplings the same as or the sensors 116 and couplings 118 for sensing one or more conditions that relate to operation of the light source. In such a case, the communication module 312 would also include source operation-related sensor I/O circuitry similar to circuitry 239 in the example of FIG. 2. Although the module 312 does not control the source operation of the fixture 313, the information obtained by such additional sensing may be reported to the higher layer control computers as it may be useful in some system applications, e.g. to report on how well or poorly particular light fixtures are operating.

As noted in the discussion of FIG. 7, the intelligent lighting device 311 may support communication with and/or control of additional or ancillary devices provided in the vicinity of the light fixture 313. Although a wide range of such additional or ancillary devices may be provided for various applications of the device 311 in the context of a particular service provided by the device 311 of FIG. 7, the specific example provided a video screen 327 and loudspeakers 329 for local information output. The monitoring and communication module 312 of the device 311 will include one or more drivers for communication with and/or control of any additional devices included in or associated with device 311. Hence, in this example, monitoring and communication module 312 includes one or more bus connected audio and/or video (A/V) drivers 335. Depending on the form/standard of the link to the video screen 327 and loudspeakers 329, the module may use a single combined driver or two separate drivers. The A/V driver(s) may be similar to drivers used in personal computers to drive an external monitor and speakers. Each driver 335 is of a type having a bus interface to enable the interface 335 to communicate internally with the μP 223 and/or other elements of the board 331 via the bus 224. For example, the module 312 may receive commands to provide audio and/or video output as well as the desired information content in packetized form via the network. The µP 223 controls the driver(s) 335 to cause the video screen 327 and loudspeakers 329 to provide outputs, and the driver(s) convert the received content to appropriate format signals so that the content is output in a presentable form as audio and video via the video screen 327 and loudspeakers 329.

The program memory for storing executable programming often is the memory on the control and communication board (either within the MCU or coupled to the µP via the bus in our three examples, FIGS. 1, 2 and 8). As outlined earlier, the exemplary sensors 116, 117 include at least some circuitry for processing the output of the transducers included as part of the sensors. In such a sensor, the circuitry receives the signal from the transducer(s) in the sensor and produces an output via the coupling that conforms to the signaling aspects of the sensor coupling standard, e.g. as a standard analog level signal on one or more pins designated for an analog connection and/or as appropriately formatted data on the pins designated for data outputs. The sensor circuitry may also receive standard control signals, e.g. digital command signals, over designated for data inputs to the sensor. Many implementations of such sensors will include a programmable processor, and some sensor configurations may include memory. If included as part of the sensor, the memory may contain the applications program (AP) for the relevant type of sensor. In such a case, the CPU may directly access the program in the sensor memory, or the application program AP may be uploaded from the sensor memory to the appropriate memory on the control and communication board.

The structure and operation of the intelligent lighting device 311, including the module 312 and fixture 313, as outlined above, were described by way of example, only.

Figure 9:
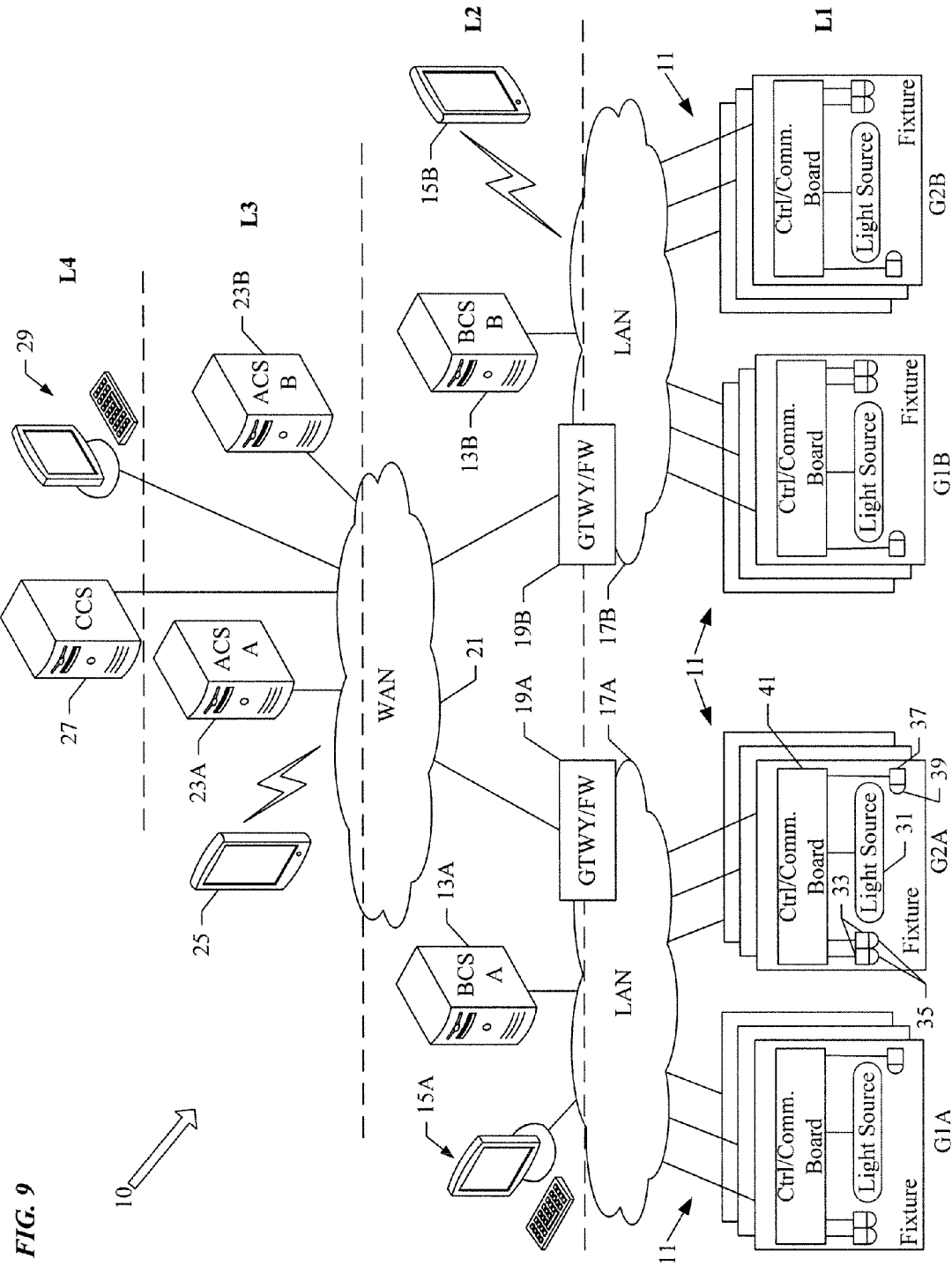
FIG. 9 is a functional block diagram of an exemplary system of intelligent lighting devices and hierarchical layers of control computers, which may utilize devices or fixtures similar to those of FIGS. 1-8.

FIG. 9 shows a system 10 that forms a network of intelligent lighting devices 11, here configured as light fixtures by way of example. The lighting devices 11 are here discussed at a somewhat higher functional level, however, each of the devices 11 can be implemented using any of the configurations discussed above and shown in the earlier drawings.

The system 10 is logically organized in a hierarchical manner represented by Layers L1 to L4 (separated by dashed horizontal lines in the drawing). In this example, the lowest layer L1 of the hierarchy is the layer formed by the intelligent lighting devices, in this case, light fixtures 11. The system 10 also includes a hierarchical arrangement of two or more layers of control computers, represented by various types of host/server computers and user terminal computers in the upper three layers L2 to L4 in the example of FIG. 9.

At the lower level L1, a number of light fixtures 11 are organized into each of several groups; and a first layer or local control system computer communicates with some number of respective groups. In the simple system example of FIG. 9, several light fixtures 11 are logically organized as a first group G1A, and another set of light fixtures 11 are logically organized as a first group G2B. These two groups of light fixtures G1A, G2A communicate with a local control server/host type computer 13A and possibly a local user terminal type computer 15A in the L2 layer via a communication network represented by way of example by the local area network 17A. Similarly, several light fixtures 11 are logically organized as a group G1B, and another set of light fixtures 11 are logically organized as another group G2B. These two groups of light fixtures G1B, G2B communicate with a local control server/host type computer 13B and possibly a local user terminal type computer 15B in the L2 layer via a communication network represented by way of example by a second local area network 17B.

The techniques discussed here are applicable to a wide range of lighting applications/systems/configurations. For example, in some sets of groups, the light fixtures may be outdoor lights such as street lamps or parking lot type lighting devices. In a street lamp example, groups of lighting devices might be those for one or some number of city blocks. For purposes of further discussion of the example of FIG. 9, we will assume that the lighting devices 11 are devices within one or more buildings of one or more enterprises. So, for example, the lighting devices 11 in each of groups G1A and G2A could be the devices for lighting a particular floor or floors of a first building; and the lighting devices 11 in each of groups G1B and G2B could be the devices for lighting a particular floor or floors of another building. In such an enterprise building example, the local host/server computer 13A might serve as a building control system (BCS A) for the first building, whereas the host/server computer 13B might serve as a building control system (BCS B) for the second building, although for other types of local organizations of the fixtures the L2 layer computers may be referred to by other designations such a local control systems or local computer systems. The terminals 15A, 15B would communicate via the network 17A or 17B with the respective BCS A 13A or BCS B 13B, although in some instances, the terminals may also communicate through a network directly with the light fixtures in the respective building or the like.

Although public networks could be used, in the building example, the networks 17A, 17B for communications between the intelligent lighting devices 11 and the respective control computers 13A, 15A, 13B, and 15B in each premises are implemented as local area networks (LANs) within respective buildings. Each LAN may be wired (e.g. metallic or optical fiber), wireless (e.g. radio frequency or free space optical) or a combination of such network technologies. For example, one building may use a wired Ethernet network, whereas another may use a wireless network such as a wireless Ethernet (WiFi) network. A wired network may utilize the lines that supply power to the light fixtures and/or the computers, or a wired local network may use separate optical or electrical network wiring. Of course, different buildings or other groups of intelligent fixtures may use different types of LANs. In an outdoor example, e.g. for implementing intelligent fixtures as street lights, the fixtures may utilize power line communication technology, cellular network transceivers, or a wireless mesh communication network topology.

The BCS type computer may be implemented with any suitable computer platform capable of running desired programming for monitoring and control functions and handling the desired work/traffic load expected for the number of intelligent light fixtures with which the particular system 13A or 13B will be working. Each enterprise or building may have one or more of the user terminals 15A, 15B. The user terminal equipment may be implemented with any suitable processing device that can also offer a suitable user interface. The terminal 15A, for example, is shown as a desktop computer with a wired link into the first LAN 17A, and the terminal 15B is shown as a touchscreen type tablet computer with a wireless link into the second LAN 17B. However, other terminal types, such as laptop computers, notebook computers, netbook computers, and smartphones may serve as the user terminal computers of layer L2.

In the exemplary four tier hierarchy, computers 13A, 13B, 15A and 15B are the first layer computers (in exemplary layer L2) in communication with the light fixtures 11 in layer L1.

Depending on the number of lighting devices and installations/locations thereof, there may be control computers in one, two or more higher layers. In our building installation example of FIG. 9, there are any number of buildings with installed light fixtures 11 and associated building control system (BCS) computers within a geographic area or region. The BCS (computers and possibly the terminal devices) in layer L2 communicate with a computer or computers in the higher layer(s) via a network. Hence, in the example, each building installation includes a gateway and/or firewall (GTWY/FW) 19A, 19B enabling communications of the various elements/devices connected to the LANs 17A, 17B via a wide area network (WAN) 21. A GTWY/FW provides the requisite communication interfacing and security enforcement for communications between the routers implementing the LAN and routers of the WAN 21. The WAN 21 may be the public Internet, or a private intranet operated by an enterprise or a service provider. As in the lower layer network communications, the links between the LANs and the WAN may use any available/practical wired or wireless technology or any commercially advantageous (cost effective) combination thereof.

The WAN 21 enables the computers in layer L2 to communicate with computers implementing one or more higher layers L3, L4, etc. of the networked architecture of system 10. For example, some number of BCS computer systems within a particular region or area may communicate with a regional or area control system (ACS) computer at the L3 level. In the illustrated example, the computers BCS 13A and BCS B 13B communicate via the WAN 21 with a computer system ACS A 23A. Although the lower layer elements are not shown for convenience, in another area, BCS computers would communicate via the WAN 21 with a computer system ACS B 23B serving as the L3 control computer for the second region or area. As represented generally by the tablet computer 25, layer L3 may also include control computers in the form of various user terminal devices of any of the types discussed earlier relative to devices 15A and 15B in layer L2. Depending on secure authorization policies a user of a terminal such as 25 may interact with either or both of the ACS computers in layer L3, via the WAN 21. Other regions may be served by L2 and L3 host/server computer systems and/or user terminal devices in a similar manner. Each of the computers in layer L3 may be coupled or linked to the network 21 via any suitable wired or wireless technology.

In an example like that shown that encompasses a number of different areas or regions, the area computers (ACSs) 23-25 in layer L3 in turn communicate with one or more computers in a still higher layer L4 of the networked system hierarchy. The communications may utilize a different network, or as illustrated, the computers 23-25 of layer L3 may communicate with the computer(s) of the higher layer L4 via the WAN 21. As the system 10 expands to cover wider geographic areas and to work with larger numbers of lighting devices, the system may be expanded to add further layers to the hierarchy, either in-between the exemplary layers or as still higher layers.

In the four tier example, the L4 layer is the top logical layer. Hence, the example includes a central control system (CCS) computer 27 at that layer. Either in association with or as an alternative to the CCS 27, the L4 layer may include a user terminal 29. Although shown as a desktop terminal 29, the user terminal may be any appropriate type of computer device, as discussed above with respect to terminal devices 15A, 15B and 25 in the L2 and L3 layers. Each of the computers in layer L4 may be coupled or linked to the network 21 via any suitable wired or wireless technology.

Returning to the lower L1 layer in our example, we will next consider the high-level aspects of the intelligent light fixture, with specific reference to elements shown within one of the fixtures in the group G2A.

As shown at a high level in FIG. 9, each lighting device 11 includes a light source 31, a sensor coupling 33 and a sensor 35 for sensing at least one external condition not related directly to operations or communications of the light fixture. The networking and related monitoring and control operations discussed here can be utilized with any desired light source, and different fixtures in the same or different buildings or outdoor locations can utilize different light sources to suit the needs of various lighting applications of the fixtures. Each light fixture 11 may be configured with a single coupling 33 and external condition sensor 35, although the example in FIG. 9 shows two such couplings and sensors in each fixture, e.g. so that each fixture can sense two different external conditions (or the same condition, for example, in different directions or locations around the fixture or to provide a combined reading and thereby improve overall accuracy).

A fixture 11 may include one or more feedback sensors for sensing operational conditions, such as source or circuit temperature, light output intensity, or one or more other characteristics of the light produced by the source, which relate to operation of the fixture. Some or all of the fixtures may have light activation related sensors, such as ON/OFF switches, room occupancy sensors, ambient light sensors for controlling lighting in response to ambient light intensity, and light dimmers. Feedback and light activation sensors are referred to collectively as internal sensors, in that they sense aspects of and/or user inputs to control the internal lighting operations of one or more of the fixtures. In the example, the illustrative fixture in group G2A includes a coupling 37 and at least one internal condition sensor 39.

Each of the light fixtures 11 is configured to sense at least one external condition not related directly to operations or communications of the light fixture. As discussed more later, each fixture also has an interface for communications with other system elements. The condition or conditions detected by sensors 35 are external in that they relate to some aspect observable in the environment around and near the fixture 11 other than those relating to the feedback, normal lighting control and/or communications of the fixture 11. Although more examples will be discussed later, a few examples of conditions that may be detected via external sensing include ambient temperature, humidity, air pressure and wind speed in the surrounding environment; images of nearby objects; motion outside the fixture; gases and other substances in the atmosphere; and temperature and moisture on objects within some distance range of the fixture 11. As such, some of the external conditions, like air temp, air quality, and vibration, relate to ambient conditions around or near the fixture itself; whereas other external conditions, like reflected or directed light, or like an image or a video of a distant object, relate to external remote conditions that exist at some distance from fixture.

A wide variety of sensor devices may be used to sense any one or more of these or other types of external conditions. For example, the sensor may be an optical device, for sensing one or more characteristics of light in the ultraviolet, visible or infrared portions of the electromagnetic spectrum. Optical devices may be used, for example, for sensing direction of light and determining position of an object as described in U.S. Pat. Nos. 6,043,873 and 5,705,804 both by Ramer et al. Other examples of optical sensors include linear and two-dimensional imaging devices.

By way of another example, a lighting device 11 may include a sensor in the form of a Micro-Electro-Mechanical System (MEMS) for sensing motion, similar to gyroscopic devices used in smartphones and the like to sense orientation, movement and direction. Here, MEMS type sensors would sense magnitude and directions of vibrations of the fixtures 11 due to external forces. Collective analysis, for example, might indicate an earthquake and the area and magnitude of the impact.

The external condition sensor coupling 33 is configured to present a sensor connection interface standardized across at least some number of the lighting devices 11. The standardized connection interface is compatible with different types of external condition sensors 35. Each sensor 35 is connected to the standardized connection interface of the sensor coupling 33. In this way, one configuration of the coupling 33 may be used with different types of sensors. Within any one fixture, there may be one, two or more couplings 33 configured to the same standard as well as one, two or more other couplings 33 configured to one or more additional standards.

Each sensor 35 is a device of one of the types compatible with the standardized interface provided through a standardized coupling 33. The location of each sensor 35 enables sensing of a condition external to the respective lighting device 11, although the condition is not directly related to operational performance of the respective lighting device. Each sensor 35 is configured to output a signal responsive to the particular sensed external condition via the standardized connection interface of the associated sensor coupling 33.

Each lighting device, in this case each fixture 11, also includes processing and communications elements, represented collectively in the high-level functional block diagram of FIG. 9 by the control/communication (Ctrl./Comm.) board 41. These elements, for example, include a processor, which is coupled to the sensor coupling(s) 33 in the fixture 11, for processing data responsive to the signal from each included external condition sensor 35. If internal sensing is provided, the processor also is coupled to the sensor coupling(s) 37 in the fixture 11, for processing data responsive to the signal from each included internal condition sensor 39.

The elements on the control/communication board 41 also include a memory, accessible to the processor, which stores programming for execution by the processor and data for processing or that has been processed by the processor during program execution. For example, the memory stores a program corresponding at least in part to each type of included external condition sensor 35. Execution of the program controls at least one function of the processor of the light fixture 11 responsive to the external condition sensed by the sensor 35, such as collection of data regarding sensed external condition(s) and related communications with at least one of the higher layer computers of the system 10.

Each light fixture 11 also includes a communication interface accessible by the processor. The communication interface is configured to enable the processor to communicate information resulting from performance of the function of the processor controlled by the program responsive to the sensed condition through the communications network, in the example, through a LAN 17A or 17B.

In the exemplary four tier hierarchy, computers 13A, 13B, 15A and 15B are first layer computers having communications interfaces enabling each of those computers to communicate through the communications networks 17A, 17B with a different respective group of the fixture type lighting devices 11. In this way, each first layer computer can receive information from the processors of its respective groups of lighting devices. At least one of the first layer computers in communication with each group of lighting devices 11 is configured to process the received information to obtain resultant information.

In the exemplary four tier hierarchy, any of the computers 23-25 in layer L3 and/or computers 27-29 in layer L4 would be a second layer computer having a communications interface to communicate through the communications network (WAN 21) to receive the resultant information from first layer computers. The second layer computer is configured to initiate at least one action in response to processing of the resultant information received from the first layer computers.

Each of the various computers in the layers L2 to L4 will run programming to control respective operations thereof including operations for processing condition related data and/or responsive communication and related actions. Although possibly somewhat different in each type of computerized device, each will run an operating system (OS) and one or more applications programs (APs) related to the sensed condition communication and processing functions of the system 10. The OS of a particular type of computerized device will provide an application programming interface (API) to allow various application programs to run on the computerized device via the respective OS and in that way utilize the various resources and functions of the computerized device. For example, the API in computerized devices at one or both the higher layers L3 and L4 of computers enables application programming for processing the condition-related data and initiating the responsive action can be written to the standardized API. In this way, it becomes possible for various parties to write application programs for the higher layer programs to respond to different types of conditions sensed by the lighting devices 11 and support different functions desired by the parties that utilize the system 10.

The computer or computers in layer L4 that receive the processed information from the layer L3 computers can initiate one or more responsive actions. The actions may involve any one or more of a variety of reporting functions, such as sending alerts to terminal devices of users who may need to know or response, generating periodic reports, or the like. The action or actions also may involve generating lighting related commands to send back down through the system 10 to cause one or more of the intelligent lighting devices 11 to modify their operations and/or to sending commands through the system 10 to cause one or more of the intelligent lighting devices 11 to collect and send and additional condition related information.

As outlined above, the external condition monitoring, collection of data obtained and processing of external condition data, from lighting devices 11 over a region or area of significant size admits of a wide range of possible applications for the data. The actions that may be initiated from the high level computer may be as wide ranging as the array of possible applications of the monitoring and data processing capabilities of the system 10. For example, the high level computer(s) may generate maps or other forms of reports relating to conditions existing across the monitored region(s). Where the sensed conditions include atmospheric conditions, such as pollution, a map might show the spread of a particular sensed pollutant allowing government personnel to identify the source, track the spread and/or initiate remedial actions. Weather related data collected at a multitude of street and highway lamps would provide much more granular information about weather conditions that is typically available from remote weather monitoring stations today. The maps or other reports generated at the higher level(s) of the system 19 or portions or such information may be distributed through the network to terminal devices of users throughout the effected area, including devices shown in the lower layers of the system 10. As another map example, if sensing of position of objects near lighting devices or sensing vibration of the lighting devices is processed to determine the occurrence and magnitude of an earthquake, a map might illustrate the relative magnitude of the quake throughout an area impacted by the quake.

To facilitate the data processing, at least the computer(s) at layer L4 have access to information about the positions of the lighting devices 11 to facilitate the relevant processing and related actions. Typically, the position information is known in advance and maintained in a database. Maps of the area(s) or region(s) can be correlated with some or all of the position information. An alternative to the position database would be to include a position detection device, such as a global satellite positioning (GPS) receiver and associated position calculation programming in the lighting devices. This later approach would allow for reporting of position changes, e.g. in response to movement of the fixture if not permanently mounted and/or if taken down and moved for some reason.

As another example of responsive action, the action initiated in the high level computer may relate to further control of lighting operations of one or more of the lighting devices 11. For example, in a situation where the sensed conditions indicate an emergency in a building, the control action may involve sending commands back down through the system 10 to selected lighting devices 11 so as to initiate operations of any number of lighting devices in the effected building, e.g. to help people to evacuate the building and/or to help responders to find the source of the emergency condition.

As noted earlier, another type of action initiated by the high level computer may involve generating commands to send back down through the system 10 to cause one or more of the intelligent lighting devices 11 to collect and send and additional condition related information. To help with damage assessment in the earthquake detection example, these commands might cause lighting devices having image sensors to capture and send back images or videos for assessment.

The elements of the system 10 may be owned and operated by one entity, such an enterprise with multiple buildings distributed over a number of dispersed geographic regions. In a street light example, a counsel of governments for a city and surrounding suburbs may jointly operate the light fixtures and computers to provide unified monitoring and response to one or more conditions in the regions served by the government entities in the council.

However, some of the elements may be operated by different entities. In a building example for diverse building owners, the monitoring service may be provided by an entity operating as a service bureau or provider. In this later case, each building owner would own and operate the light fixtures and LAN in the respective building. The BCS computers and any terminals in layer L1 may be on the premises or remote, and that equipment may be owner by the building owner or the service provider. However, such L1 computers will be configured, at least for the monitoring service, by the entity that provides the monitoring service. The computer(s) at the higher levels would likely be owned and operated by the monitoring service provider, although some may be owned and operated by other entities with whom the service provider has a cooperative agreement, e.g. to a company or government entity that may agree to respond to conditions sensed on premises monitored by the equipment of the service provider.

The discussion here relates to monitoring of one or more conditions external to the lighting devices over a number of premises and/or over a wide geographic area. The intelligence of the devices and the associated feedback sensing, however, allows for a wide range of control functions related to the lighting application as well. For example, the same communication and computer resources can be used to monitor and control the lighting operations of the intelligent lighting devices. For example, the fixtures may report conditions of the sources and fixture electronics to the control system computers and respond to commands from the control system computers to automatically adjust lighting operations. Condition reports generated by a high level computer can be used to advise appropriate personnel to service particular lighting devices, e.g. to replace light source elements and/or other device components when services is appropriate.

In several examples, the intelligence and sensors are integrated with or attached to the fixture or other element that incorporates the light source. However, or some installations, there may be some separation between the fixture or other element that incorporates the light source and the electronic components that provide the intelligence and communication capabilities. Also, in the examples, the sensors are incorporated in the fixture or module that houses the electronic components that provide the intelligence and communication capabilities. However, depending on the condition(s) to be sensed and/or the particular installation, the sensors and standardized couplings may be mounted somewhat separately and connected or otherwise coupled to the electronic components that provide the intelligence and communication capabilities.

The monitoring and communications elements may be applied to or combined with any type of light source. Hence, the intelligent lighting devices may be any desirable type of indoor or outdoor lighting device, signal lighting devices such as traffic lights, lighted signage, etc. A system like that of FIG. 9 may include within the one system any number of these different types lighting devices. A system operated by a city or municipality, for example, might add intelligence to street lights of various types, traffic lights and various types of indoor building lights in buildings used by the government. A system operated by a state or country might add intelligence to lights of the types mentioned with regard to the city, in each city or town of the state or country as well as to highway lights and sign lighting along roads, streets and highways between cities and towns in the jurisdiction. The broader the coverage, the more varied the types of lighting devices that are likely to be included in the system.

A system run by a private enterprise, either to monitor its own premises or to provide monitoring and the like as services to its customers might install intelligent lighting devices or add intelligent modules like that of FIGS. 7 and 8, for indoor and outdoor lighting applications as various types of lighting devices on private property. If such an enterprise sells the services to a government, then the enterprise would install and operate a system like that described earlier for a city, state or country. One service provider enterprise might also sell the services both to government and to private parties, essentially resulting in an overall system that includes both government and private installations of the intelligent lighting devices and could combine data from all of the intelligent lighting devices.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A lighting device, comprising:
   a light source;
   a sensor coupling, configured to present a sensor connection interface standardized across at least a plurality of lighting devices, the standardized connection interface being compatible with a plurality of different types of sensors;
   a sensor connected to the standardized connection interface of the sensor coupling, the sensor being of one of the types and located so as to sense one of a plurality of conditions external to the lighting device not directly related to operational performance of the lighting device, the sensor being configured to output a signal responsive to the one sensed condition via the standardized connection interface of the sensor coupling;
   a processor coupled to the sensor coupling for processing data responsive to the signal from the sensor;
   a memory accessible to the processor;
   a program corresponding at least in part to the one type of the sensor, stored in the memory for execution by the processor, for controlling at least one function of the processor responsive to the condition sensed by the sensor and for causing the processor to implement a standardized application programming interface with respect to the at least one function; and
   a communication interface accessible by the processor, configured to enable the processor to communicate information resulting from the at least one function of the processor responsive to the condition sensed by the sensor through a communications network in a manner conforming to the standardized application programming interface.

2. The lighting device of claim 1, further comprising:
   a second sensor coupling configured to present a standardized sensor connection interface, the standardized connection interface being compatible with the plurality of different types of sensors;
   a second sensor connected to the standardized connection interface of the second of the sensor coupling, the second sensor being of a second one of the types different from the first type and located so as to sense a second one of the conditions external to the lighting device not directly related to operation of the lighting device, the second sensor being configured to output a second signal responsive to the first sensed condition via the standardized connection interface of the second sensor coupling, wherein the processor is further coupled to process data responsive to the second signal from the second sensor; and
   programming corresponding at least in part to the second type of the sensor, stored in the memory for execution by the processor, for controlling at least one function of the processor responsive to the condition sensed by the second sensor.

3. The lighting device as in claim 2, wherein the processor is also coupled to control the light source.

4. The lighting device as in claim 3, further comprising:
   a third sensor of a type and located so as to sense a condition related to operation of the lighting device, the third sensor being configured to output a third signal responsive to the sensed condition related to operation of the lighting device, wherein:
   the processor is further coupled to process data responsive to the third signal from the third sensor, and
   programming executed by the processor configures the processor to control operation of the light source at least in part responsive to the processing of the data responsive to the third signal from the third sensor.

5. The lighting device as in claim 4, wherein the third sensor is a type of sensor selected from the group consisting of: a sensor for detecting temperature of one or more components of the lighting device, a feedback light sensor for detecting intensity or other characteristic of light produced by the lighting device, an occupancy sensor for detecting a condition indicative of occupancy of a region to be illuminated by the lighting device and an ambient light sensor for detecting ambient light near the lighting device.

6. The lighting device as in claim 4, wherein the light source comprises one or more solid state light emitters.

7. The lighting device as in claim 2, wherein:
   the sensor is a sensor of a type and is located so as to detect an ambient condition around or near the lighting device, and
   the second sensor is of a type and is located so as to detect a remote condition at some distance from lighting device.

8. The lighting device as in claim 7, wherein:
   the sensor is a type of sensor selected from the group consisting of: a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor; and
   the second sensor is a type of sensor selected from the group consisting of: a directional light sensor, a video or still image sensor, and a sound detector.

9. The lighting device as in claim 1, wherein the sensor is a type of sensor selected from the group consisting of: a fire detector, a smoke detector, an airborne chemical detector, an airborne biological agent detector, a carbon monoxide sensor, an air temperature sensor, an air pressure detector, a humidity sensor, a moisture detector, an air speed detector, and a micro-electro-mechanical system type sensor.

10. The lighting device as in claim 1, wherein the sensor is a type of sensor selected from the group consisting of: a directional light sensor, a video or still image sensor, and a sound detector.

11. The lighting device as in claim 1, further comprising:
another sensor of a type and located so as to sense a condition related to operation of the lighting device, the other sensor being configured to output a signal responsive to the sensed condition related to operation of the lighting device, wherein:
the processor is also coupled to control the light source,
the processor is further coupled to process data responsive to the third signal from the third sensor, and
programming executed by the processor configures the processor to control operation of the light source at least in part responsive to the processing of the data responsive to the signal from the other sensor.

12. The lighting device as in claim 1, wherein the program further causes the processor to communicate information resulting from the at least one function of the processor responsive to the condition sensed by the sensor to a third party not directly related to operational performance of the lighting device.

13. A module for use with a light source, the module comprising:
a sensor coupling, configured to present a sensor connection interface standardized across at least a plurality of lighting devices, the standardized connection interface being compatible with a plurality of different types of sensors;
a sensor connected to the standardized connection interface of the sensor coupling, the sensor being of one of the types and located so as to sense one of a plurality of conditions not directly related to operational performance of the light source, the sensor being configured to output a signal responsive to the one sensed condition via the standardized connection interface of the sensor coupling:
a processor coupled to the sensor coupling for processing data responsive to the signal from the sensor;
a memory accessible to the processor;
a program corresponding at least in part to the one type of the sensor, stored in the memory for execution by the processor, for controlling at least one function of the processor responsive to the condition sensed by the sensor and for causing the processor to implement a standardized application programming interface with respect to the at least one function; and
a communication interface accessible by the processor, configured to enable the processor to communicate information resulting from the at least one function of the processor responsive to the condition sensed by the sensor through a communications network in a manner conforming to the standardized application programming interface.

14. The apparatus of claim 13, further comprising:
a second sensor coupling configured to present a standardized sensor connection interface, the standardized connection interface being compatible with the plurality of different types of sensors;
a second sensor connected to the standardized connection interface of a second of the sensor couplings, the second sensor being of a second one of the types different from the first type and located so as to sense a second one of the conditions not directly related to operation of the light source, the second sensor being configured to output a second signal responsive to the first sensed condition via the standardized connection interface of the second sensor coupling,
wherein the processor is further coupled to process data responsive to the second signal from the second sensor; and
programming corresponding at least in part to the second type of the sensor, stored in the memory for execution by the processor, for controlling at least one function of the processor responsive to the condition sensed by the second sensor.

15. The apparatus of claim 14, further comprising:
a module housing containing at least the processor, memory and communication interface,
wherein the housing is configured for mounting together with a fixture containing the light source.

16. The apparatus of claim 14, further comprising:
a second communication interface; and
a local wireless transceiver coupled to the second communication interface.

17. The apparatus of claim 14, further comprising:
an output driver, coupled for control by the processor, configured to drive an information output device coupled to the apparatus,
wherein programming executed by the processor configures the apparatus to receive information for local output from the network via the communication interface and to operate the at least one output driver to cause the information output device to reproduce the received information.

18. The apparatus of claim 13, further comprising:
a module housing containing at least the processor, memory and communication interface,
wherein the housing is configured for mounting together with a fixture containing the light source.

19. The apparatus of claim 13, further comprising:
a second communication interface; and
a local wireless transceiver coupled to the second communication interface.

20. The apparatus of claim 13, further comprising:
an output driver, coupled for control by the processor, configured to drive an information output device coupled to the apparatus,
wherein programming executed by the processor configures the apparatus to receive information for local output from the network via the communication interface and to operate the at least one output driver to cause the information output device to reproduce the received information.

* * * * *